United States Patent
Prim et al.

(10) Patent No.: US 12,234,421 B2
(45) Date of Patent: Feb. 25, 2025

(54) CARBON DIOXIDE RECYCLE STREAM PROCESSING WITH ETHYLENE GLYCOL DEHYDRATING IN AN ENHANCED OIL RECOVERY PROCESS

(71) Applicant: Pilot Intellectual Property, LLC, Houston, TX (US)

(72) Inventors: Eric Prim, Spring, TX (US); Mark Mathias, The Woodlands, TX (US)

(73) Assignee: Pilot Intellectual Property, LLC, Houston, TX (US)

( * ) Notice: Subject to any disclaimer, the term of this patent is extended or adjusted under 35 U.S.C. 154(b) by 804 days.

(21) Appl. No.: 17/459,523

(22) Filed: Aug. 27, 2021

(65) Prior Publication Data

US 2023/0072750 A1    Mar. 9, 2023

(51) Int. Cl.
*C10L 3/10* (2006.01)
*B01D 3/14* (2006.01)
(Continued)

(52) U.S. Cl.
CPC .............. *C10L 3/104* (2013.01); *B01D 3/143* (2013.01); *B01D 17/02* (2013.01); *B01D 53/002* (2013.01); *B01D 53/263* (2013.01); *B01D 53/265* (2013.01); *C09K 8/594* (2013.01); *C10L 3/103* (2013.01); *E21B 43/164* (2013.01);
(Continued)

(58) Field of Classification Search
None
See application file for complete search history.

(56) References Cited

U.S. PATENT DOCUMENTS 2,026,019 A    12/1935    Carney
2,296,992 A    9/1942    Gary
(Continued)

FOREIGN PATENT DOCUMENTS

CA    2764846 A1    2/2011
WO    9905081 A1    2/1999
(Continued)

OTHER PUBLICATIONS

Foreign Communication From a Counterpart Application, Canadian Application No. 3129379, Canadian Office Action Nov. 30, 2022, 3 pages.
(Continued)

*Primary Examiner* — Jason M Greene
(74) *Attorney, Agent, or Firm* — Conley Rose, P.C.; Grant Rodolph; Nicholas K. Beaulieu

(57) ABSTRACT

A method for carbon dioxide recycle stream processing with ethylene glycol dehydrating in an enhanced oil recovery process includes receiving a first carbon dioxide recycle stream from a hydrocarbon formation, adding ethylene glycol to the first carbon dioxide recycle stream to produce an ethylene glycol and carbon dioxide recycle stream, condensing the ethylene glycol and carbon dioxide stream to produce a multiphase stream, separating the multiphase stream into a water and ethylene glycol stream and a second carbon dioxide recycle stream, separating the water and ethylene glycol stream into a water stream and an ethylene glycol stream, and separating the second carbon dioxide recycle steam into a carbon dioxide reinjection stream and a natural gas liquids stream.

20 Claims, 5 Drawing Sheets

(51) Int. Cl.
*B01D 17/02* (2006.01)
*B01D 53/00* (2006.01)
*B01D 53/26* (2006.01)
*C09K 8/594* (2006.01)
*E21B 43/16* (2006.01)
*E21B 43/40* (2006.01)

(52) U.S. Cl.
CPC ........ *E21B 43/40* (2013.01); *C10L 2290/543* (2013.01); *C10L 2290/545* (2013.01)

(56) References Cited

U.S. PATENT DOCUMENTS

| | | | |
|---|---|---|---|
| 2,322,635 | A | 6/1943 | Keith, Jr. |
| 2,673,829 | A | 3/1954 | King |
| 2,875,833 | A | 3/1959 | Martin |
| 2,955,081 | A | 10/1960 | Cobb, Jr. |
| 3,090,683 | A | 5/1963 | Berger |
| 3,177,138 | A | 4/1965 | Larrison |
| 3,441,483 | A | 4/1969 | Hart |
| 4,070,165 | A | 1/1978 | Colton |
| 4,136,738 | A | 1/1979 | Haynes, Jr. et al. |
| 4,318,723 | A | 3/1982 | Holmes et al. |
| 4,325,432 | A | 4/1982 | Henry |
| 4,336,046 | A | 6/1982 | Schorre et al. |
| 4,370,236 | A | 1/1983 | Ferguson |
| 4,374,657 | A | 2/1983 | Schendel et al. |
| 4,428,759 | A | 1/1984 | Ryan et al. |
| 4,441,900 | A | 4/1984 | Swallow |
| 4,451,275 | A | 5/1984 | Vines et al. |
| 4,462,814 | A | 7/1984 | Holmes et al. |
| 4,474,591 | A | 10/1984 | Arand et al. |
| 4,529,411 | A | 7/1985 | Goddin, Jr. et al. |
| 4,563,202 | A | 1/1986 | Yao et al. |
| 4,595,404 | A | 6/1986 | Ozero et al. |
| 4,664,190 | A | 5/1987 | Carpentier |
| 4,683,948 | A | 8/1987 | Fleming |
| 4,720,294 | A | 1/1988 | Lucadamo et al. |
| 4,753,666 | A | 6/1988 | Pastor et al. |
| 4,762,543 | A | 8/1988 | Pantermuehl et al. |
| 4,765,407 | A | 8/1988 | Yuvancic |
| 4,770,683 | A | 9/1988 | Stothers |
| 4,936,887 | A | 6/1990 | Waldo et al. |
| 4,976,849 | A | 12/1990 | Soldati |
| 5,019,279 | A | 5/1991 | Haines et al. |
| 5,402,645 | A | 4/1995 | Jonhson et al. |
| 5,411,721 | A | 5/1995 | Doshi et al. |
| 5,536,303 | A | 7/1996 | Ebeling |
| 5,687,584 | A | 11/1997 | Mehra |
| 5,766,423 | A | 6/1998 | Smith |
| 5,806,339 | A | 9/1998 | Manley |
| 6,010,674 | A | 1/2000 | Miles et al. |
| 6,128,919 | A | 10/2000 | Daus et al. |
| 6,505,683 | B2 | 1/2003 | Minkkinen et al. |
| 6,648,944 | B1 | 11/2003 | Baker et al. |
| 6,915,662 | B2 | 7/2005 | Wilkinson et al. |
| 7,219,513 | B1 | 5/2007 | Mostafa |
| 7,377,127 | B2 | 5/2008 | Mak |
| 7,642,394 | B1 | 1/2010 | Carle et al. |
| 7,806,965 | B2 | 10/2010 | Stinson |
| 8,505,332 | B1 | 8/2013 | Prim |
| 9,200,833 | B2 | 12/2015 | Prim et al. |
| 9,255,731 | B2 | 2/2016 | Prim et al. |
| 9,574,823 | B2 | 2/2017 | Prim |
| 9,752,826 | B2 | 9/2017 | Prim |
| 10,995,981 | B2 | 5/2021 | Prim |
| 11,125,495 | B2 | 9/2021 | Prim |
| 2003/0161780 | A1 | 8/2003 | Howard et al. |
| 2004/0206112 | A1 | 10/2004 | Mak |
| 2006/0065015 | A1 | 3/2006 | McCoy |
| 2007/0208432 | A1 | 9/2007 | Hawrysz |
| 2007/0231244 | A1 | 10/2007 | Shah et al. |
| 2008/0116115 | A1 | 5/2008 | Shamsudin |
| 2008/0156035 | A1 | 7/2008 | Aspelund et al. |
| 2008/0167511 | A1 | 7/2008 | Prim |
| 2008/0190025 | A1 | 8/2008 | Stinson |
| 2011/0197629 | A1* | 8/2011 | Prim ...................... C10L 3/104 62/618 |
| 2012/0096895 | A1 | 4/2012 | Patel et al. |
| 2012/0222552 | A1 | 9/2012 | Ravikovitch et al. |
| 2015/0025292 | A1 | 1/2015 | Pham Duc et al. |
| 2015/0184932 | A1 | 7/2015 | Higginbotham et al. |
| 2015/0267129 | A1 | 9/2015 | Meyer |
| 2018/0291281 | A1 | 10/2018 | Prim |

FOREIGN PATENT DOCUMENTS

| | | | |
|---|---|---|---|
| WO | 2009059641 | A1 | 5/2009 |
| WO | 2015142380 | A1 | 9/2015 |

OTHER PUBLICATIONS

Advisory Action dated Oct. 13, 2022; U.S. Appl. No. 15/949,846, filed Apr. 10, 2018; 4 pages.
Office Action dated Oct. 14, 2022; U.S. Appl. No. 17/402,158, filed Aug. 13, 2021; 48 pages.
Advisory Action dated Oct. 27, 2021; U.S. Appl. No. 15/949,846, filed Apr. 10, 2018; 4 pages.
Prim, Eric, et al.; U.S. Appl. No. 17/402,158; Title: Carbon Dioxide Recycle Stream Processing with Ethylene Glycol Dehydrating in an Enhanced Oil Recovery Process; Filing Date: Aug. 13, 2021; Specification 32 pages; 4 Drawing Sheets (Figs. 1-4).
Final Office Action dated Jun. 10, 2022; U.S. Appl. No. 15/949,846, filed Apr. 10, 2018; 17 pages.
Foreign Communication From a Counterpart Application, Canadian Application No. 2949044, Canadian Notice of Allowance dated Dec. 21, 2021, 1 page.
Office Action dated Dec. 20, 2021; U.S. Appl. No. 15/949,846, filed Apr. 10, 2018; 17 pages.
Final Office Action dated Jun. 18, 2014; U.S. Appl. No. 13/096,788, filed Apr. 28, 2011; 26 pages.
Advisory Action dated Sep. 23, 2014, U.S. Appl. No. 13/096,788, filed Apr. 28, 2011, 3 pages.
Office Action dated Oct. 23, 2014, 36 pages, U.S. Appl. No. 13/096,788, filed Apr. 28, 2011.
Notice of Allowance dated Mar. 27, 2015; U.S. Appl. No. 13/096,788, filed Apr. 28, 2011; 9 pages.
Notice of Allowance dated May 19, 2015, 13 pages, U.S. Appl. No. 13/096,788, filed Apr. 28, 2011.
Corrected Notice of Allowability dated Jul. 23, 2015, 10 pages, U.S. Appl. No. 13/096,788, filed Apr. 28, 2011.
Final Office Action dated Nov. 1, 2016, 6 pages, U.S. Appl. No. 13/096,788, filed Apr. 28, 2011.
Advisory Action dated Aug. 22, 2013, 3 pages, U.S. Appl. No. 13/096,788, dated Apr. 28, 2011.
Office Action dated Nov. 26, 2013, 36 pages, U.S. Appl. No. 13/096,788, dated Apr. 28, 2011.
Office Action dated Jan. 24, 2014; U.S. Appl. No. 13/946,753, filed Jul. 19, 2013; 37 pages.
Final Office Action dated Jul. 30, 2014; U.S. Appl. No. 13/946,753, filed Jul. 19, 2013; 19 pages.
Office Action dated Jan. 16, 2015, U.S. Appl. No. 13/946,753, filed Jul. 16, 2015, 30 pages.
Final Office Action dated Jul. 30, 2015, 33 pages, U.S. Appl. No. 13/946,753, filed Jul. 19, 2013.
Office Action dated Nov. 4, 2015, 20 pages, U.S. Appl. No. 13/946,753, filed Jul. 19, 2013.
Final Office Action dated May 10, 2016, 33 pages, U.S. Appl. No. 13/946,753, filed Jul. 19, 2013.
Advisory Action dated Jul. 29, 2016, 5 pages, U.S. Appl. No. 13/946,753, filed Jul. 19, 2013.
Notice of Allowance dated Oct. 17, 2016, 13 pages, U.S. Appl. No. 13/946,753, filed Jul. 19, 2013.
Office Action dated Jul. 15, 2014; U.S. Appl. No. 13/946,773, filed Jul. 19, 2013; 28 pages.
Final Office Action dated Jan. 29, 2015 U.S. Appl. No. 13/946,773, filed Jul. 19, 2013; 24 pages.

(56) References Cited

OTHER PUBLICATIONS

Advisory Action dated May 13, 2015, 9 pages, U.S. Appl. No. 13/946,773, filed Jul. 19, 2013.
Office Action dated Aug. 5, 2015, 23 pages, U.S. Appl. No. 13/946,773, filed Jul. 19, 2013.
Final Office Action dated Jan. 6, 2016, 24 pages, U.S. Appl. No. 13/946,773, filed Jul. 19, 2013.
Office Action dated May 6, 2016, 17 pages, U.S. Appl. No. 13/946,773, filed Jul. 19, 2013.
Final Office Action dated Dec. 5, 2016, 24 pages, U.S. Appl. No. 13/946,773, filed Jul. 19, 2013.
Advisory Action dated Mar. 10, 2017, 4 pages, U.S. Appl. No. 13/946,773, filed Jul. 19, 2013.
Notice of Allowance dated May 4, 2017, 12 pages, U.S. Appl. No. 13/946,773, filed Jul. 19, 2013.
Office Action dated Jul. 15, 2014; U.S. Appl. No. 13/946,774, filed Jul. 19, 2013; 26 pages.
Final Office Action dated Feb. 10, 2015, 23 pages, U.S. Appl. No. 13/946,774, filed Jul. 19, 2013.
Advisory Action dated Jun. 12, 2015, 12 pages, U.S. Appl. No. 13/946,774, filed Jul. 19, 2013.
Notice of Allowance dated Oct. 6, 2015, 14 pages, U.S. Appl. No. 13/946,774, filed Jul. 19, 2013.
Corrected Notice of Allowability dated Dec. 8, 2015, 15 pages, U.S. Appl. No. 13/946,774, filed Jul. 19, 2013.
Office Action dated Jul. 14, 2014; U.S. Appl. No. 13/946,789, filed Jul. 19, 2013; 25 pages.
Notice of Allowance dated Jun. 19, 2015, 8 pages, U.S. Appl. No. 13/946,789, filed Jul. 19, 2013.
Final Office Action dated Feb. 3, 2015, U.S. Appl. No. 13/946,789, filed Jul. 19, 2013; 22 pages.
Notice of Allowance dated May 14, 2015, 12 pages, U.S. Appl. No. 13/946,789, filed Jul. 19, 2013.
Office Action dated Feb. 6, 2019; U.S. Appl. No. 15/666,339, filed Aug. 1, 2017; 6 pages.
Office Action dated Jun. 19, 2019; U.S. Appl. No. 15/666,339, filed Aug. 1, 2017; 46 pages.
Final Office Action dated Nov. 15, 2019; U.S. Appl. No. 15/666,339, filed Aug. 1, 2017; 18 pages.
Advisory Action dated Jan. 15, 2020; U.S. Appl. No. 15/666,339, filed Aug. 1, 2017; 3 pages.
Office Action dated Jun. 12, 2020; U.S. Appl. No. 15/666,339, filed Aug. 1, 2017; 30 pages.
Notice of Allowance dated Mar. 22, 2021; U.S. Appl. No. 15/666,339, filed Aug. 1, 2017; 18 pages.
Office Action dated Mar. 10, 2020; U.S. Appl. No. 16/733,982, filed Jan. 3, 2020; 30 pages.
Final Office Action dated Jun. 25, 2020; U.S. Appl. No. 16/733,982, filed Jan. 3, 2020; 16 pages.
Advisory Action dated Aug. 31, 2020; U.S. Appl. No. 16/733,982, filed Jan. 3, 2020; 4 pages.
Notice of Allowance dated May 20, 2021; U.S. Appl. No. 16/733,982, filed Jan. 3, 2020; 18 pages.
Office Action dated Mar. 19, 2020; U.S. Appl. No. 15/949,846, filed Apr. 10, 2018; 50 pages.
Final Office Action dated Jul. 30, 2020; U.S. Appl. No. 15/949,846, filed Apr. 10, 2018; 15 pages.
Advisory Action dated Oct. 20, 2020; U.S. Appl. No. 15/949,846, filed Apr. 10, 2018; 4 pages.
Office Action dated Feb. 8, 2021; U.S. Appl. No. 15/949,846, filed Apr. 10, 2018; 24 pages.
Final Office Action dated Jul. 16, 2021; U.S. Appl. No. 15/949,846, filed Apr. 10, 2018; 16 pages.
Foreign Communication From a Counterpart Application, Canadian Application No. 3129379, Canadian Notice of Allowance dated Sep. 19, 2023, 1 page.
Advisory Action dated Aug. 30, 2023; U.S. Appl. No. 17/402,158, filed Aug. 13, 2021; 4 pages.
Office Action dated Sep. 28, 2023; U.S. Appl. No. 17/402,158, filed Aug. 13, 2021; 17 pages.
Final Office Action dated May 24, 2023; U.S. Appl. No. 17/402,158, filed Aug. 13, 2021; 25 pages.
The University of Texas of the Permian Basin; "CO2 Facilities and Plants" CEED CO2 Flooding Shortcourse No. 7; Center for Energy and Economic Diversification; Dec. 8, 1998; 214 pages.
Jarrell, Perry M., et al.; "Practical Aspects of CO2 Flooding"; Society of Petroleum Engineers (SPE) Monograph Series; vol. 22; Richardson, Texas; 2002; 115 pages.
Stewart, Maurice, et al.; "Crude Stabilization"; Fractionation Towers; Science Direct; 2009; 11 pages.
Pall; "Condensate Stabilization/Fractionation"; https://www.pall.com/en/oil-gas/midstream/lng-stabilization-column.html; 2020; 5 pages.
Foreign Communication From a Counterpart Application, Canadian Application No. 2739366, Canadian Office Action dated Oct. 21, 2015, 4 pages.
Foreign Communication From a Counterpart Application, Canadian Application No. 2739366, Canadian Office Action dated Jan. 21, 2015, 2 pages.
Foreign Communication From a Counterpart Application, Canadian Application No. 2739366, Canadian Office Action dated Aug. 21, 2013, 3 pages.
Foreign Communication From a Counterpart Application, Canadian Application No. 2739366, Canadian Office Action dated Apr. 16, 2014, 2 pages.
Foreign Communication From a Counterpart Application, Canadian Application No. 2739366, Canadian Notice of Allowance dated May 20, 2016, 1 pages.
Foreign Communication From a Counterpart Application, Canadian Application No. 2949015, Canadian Office Action dated Sep. 22, 2017, 4 pages.
Foreign Communication From a Counterpart Application, Canadian Application No. 2949015, Canadian Office Action dated Jul. 26, 2018, 3 pages.
Foreign Communication From a Counterpart Application, Canadian Application No. 2949015, Canadian Notice of Allowance dated Mar. 27, 2019, 1 page.
Foreign Communication From a Counterpart Application, Canadian Application No. 2949058, Canadian Office Action dated Sep. 25, 2017, 5 pages.
Foreign Communication From a Counterpart Application, Canadian Application No. 2949058, Canadian Notice of Allowance dated Jul. 30, 2018, 1 page.
Foreign Communication From a Counterpart Application, Canadian Application No. 2949016, Canadian Office Action dated Sep. 19, 2017, 4 pages.
Foreign Communication From a Counterpart Application, Canadian Application No. 2949016, Canadian Notice of Allowance dated Jul. 27, 2018, 1 page.
Foreign Communication From a Counterpart Application, Canadian Application No. 2949087, Canadian Office Action dated Sep. 19, 2017, 4 pages.
Foreign Communication From a Counterpart Application, Canadian Application No. 2949087, Canadian Notice of Allowance dated Jul. 27, 2018, 1 page.
Foreign Communication From a Counterpart Application, Canadian Application No. 2949042, Canadian Office Action dated Oct. 17, 2017, 4 pages.
Foreign Communication From a Counterpart Application, Canadian Application No. 2949042, Canadian Office Action dated Jun. 29, 2018, 4 pages.
Foreign Communication From a Counterpart Application, Canadian Application No. 2949042, Canadian Office Action dated Mar. 7, 2019, 4 pages.
Foreign Communication From a Counterpart Application, Canadian Application No. 2949042, Canadian Office Action dated Dec. 5, 2019, 3 pages.
Foreign Communication From a Counterpart Application, Canadian Application No. 2949042, Canadian Notice of Allowance dated May 26, 2020, 1 page.
Foreign Communication From a Counterpart Application, Canadian Application No. 2949039, Canadian Office Action dated Sep. 22, 2017, 4 pages.

(56) References Cited

OTHER PUBLICATIONS

Foreign Communication From a Counterpart Application, Canadian Application No. 2949039, Canadian Notice of Allowance dated Jul. 27, 2018, 1 page.
Foreign Communication From a Counterpart Application, Canadian Patent No. 2949039, Request for Re-Examination dated Feb. 26, 2020; 120 pages.
Foreign Communication From a Counterpart Application, Canadian Patent No. 2949039, Notification of Compliant Request for Re-Examination; 2 pages.
Foreign Communication From a Counterpart Application, Canadian Patent No. 2949039, Notification of Re- Examination Results; 17 pages.
Foreign Communication From a Counterpart Application, Canadian Application No. 2949051, Canadian Office Action dated Apr. 12, 2018, 6 pages.
Foreign Communication From a Counterpart Application, Canadian Application No. 2949051, Canadian Notice of Allowance dated Jan. 17, 2019, 1 page.
Foreign Communication From a Counterpart Application, Canadian Application No. 2949044, Canadian Office Action dated Apr. 11, 2018, 7 pages.
Foreign Communication From a Counterpart Application, Canadian Application No. 2949044, Canadian Office Action dated Dec. 20, 2018, 6 pages.
Foreign Communication From a Counterpart Application, Canadian Application No. 2949044, Canadian Office Action dated Sep. 16, 2019, 6 pages.
Foreign Communication From a Counterpart Application, Canadian Application No. 2949044, Canadian Office Action dated Sep. 3, 2020, 3 pages.
Foreign Communication From a Counterpart Application, Canadian Application No. 2949044, Canadian Office Action dated Mar. 30, 2021, 3 pages.
Foreign Communication From a Counterpart Application, Canadian Application No. 2949055, Canadian Office Action dated Apr. 11, 2018, 7 pages.
Foreign Communication From a Counterpart Application, Canadian Application No. 2949055, Canadian Office Action dated Dec. 28, 2018, 3 pages.
Foreign Communication From a Counterpart Application, Canadian Application No. 2949055, Canadian Notice of Allowance dated Sep. 27, 2019, 1 page.
Foreign Communication From a Counterpart Application, Canadian Application No. 2949014, Canadian Office Action dated Apr. 11, 2018, 8 pages.
Foreign Communication From a Counterpart Application, Canadian Application No. 2949014, Canadian Office Action dated Dec. 20, 2018, 3 pages.
Foreign Communication From a Counterpart Application, Canadian Application No. 2949014, Canadian Notice of Allowance dated Sep. 27, 2019, 1 page.
Foreign Communication From a Counterpart Application, Canadian Application No. 3001039, Canadian Office Action dated Apr. 4, 2019, 5 pages.
Foreign Communication From a Counterpart Application, Canadian Application No. 3001039, Canadian Office Action dated Nov. 26, 2019, 3 pages.
Foreign Communication From a Counterpart Application, Canadian Application No. 3001039, Canadian Notice of Allowance dated May 21, 2020, 1 page.
Office Action dated Oct. 27, 2011; U.S. Appl. No. 12/122,336, filed May 16, 2008, 17 pages.
Office Action dated Jun. 29, 2012; U.S. Appl. No. 12/122,336, filed May 16, 2008, 18 pages.
Final Office Action dated Feb. 21, 2013; U.S. Appl. No. 12/122,336, filed May 16, 2008, 24 pages.
Notice of Allowance dated May 8, 2013; U.S. Appl. No. 12/122,336, filed May 16, 2008; 23 pages.
Office Action dated Jul. 19, 2012; U.S. Appl. No. 13/096,788, filed Apr. 28, 2011; 22 pages.
Final Office Action dated May 8, 2013; U.S. Appl. No. 13/096,788, filed Apr. 28, 2011; 23 pages.
"Declaration of David A. Rockstraw, Ph.D., P. E."; Exhibit 1002, Petition for Inter Partes Review of U.S. Pat. No. 8,505,332, Case No. IPR2024-00385; Jan. 23, 2024; 114 pages.
"Prosecution History of U.S. Pat. No. 8,505,332"; Exhibit 1003 of Petition for Inter Partes Review, U.S. Pat. No. 8,505,332, Case No. IPR2024-00385; Jan. 23, 2024; pp. 1-154.
"Prosecution History of U.S. Pat. No. 8,505,332"; Exhibit 1003, Petition for Inter Partes Review of U.S. Pat. No. 8,505,332, Case No. IPR2024-00385; Jan. 23, 2024; pp. 155-308.
"Declaration of Sylvia D. Hall-Ellis, Ph.D."; Exhibit 1008, Petition for Inter Partes Review of U.S. Pat. No. 8,505,332, Case No. IPR2024-00385; Jan. 23, 2024; 111 pages.
"Plaintiffs Pilot Energy Solutions, LLC and Pilot Intellectual Property, LLC's Original Complaint"; Exhibit 1009, Petition for Inter Partes Review of U.S. Pat. No. 8,505,332, Case No. IPR2024-00385; Jan. 23, 2024; 146 pages.
"Plaintiffs Response in Opposition to Defendants' Motion to Dismiss for Failure to State a Claim Under Frcp 12(B) (6)"; Exhibit 1011, Petition for Inter Partes Review of U.S. Pat. No. 8,505,332, Case No. IPR2024-00385; Jan. 23, 2024; 26 pages.
"Scheduling Order"; Exhibit 1013 of Petition for Inter Partes Review, U.S. Pat. No. 8,505,332, Case No. IPR2024-00385; Jan. 23, 2024; 4 pages.
"Comparison of Districts Within the First Circuit"; Exhibit 1014, Petition for Inter Partes Review of U.S. Pat. No. 8,505,332, Case No. IPR2024-00385; Jan. 23, 2024; 4 pages.
"Curriculum Vitae of Dr. David Rockstraw"; Exhibit 1015, Petition for Inter Partes Review of U.S. Pat. No. 8,505,332, Case No. IPR2024-00385; Jan. 23, 2024; 11 pages.
*Scout Energy Management, LLC, and Chevron U.S.A. Inc.*, Petitioners v. *Pilot Intellectual Property, LLC*, Patent Owner; "Petition for *Inter Partes* Review of U.S. Pat. No. 8,505,332"; Case No. IPR2024-00385; Jan. 23, 2024; 102 pages.
Aycaguer, Anne-Christine, et al.; "Reducing Carbon Dioxide Emissions with Enhanced Oil Recovery Projects: A Life Cycle Assessment Approach"; Energy & Fuels; vol. 15, No. 2; Mar./Apr. 2001; 9 pages.
Ryan, J. M., et al.; "Treating Acid & Sour Gas: CO2 Recovery by the Ryan/Holmes Process"; Chemical Engineering Progress; vol. 80, No. 10; Oct. 1984; 6 pages.
Holmes, A. S., et al.; "Pilot Tests Prove Ryan/Holmes Cryogenic Acid Gas/Hydrocarbon Separations"; Gas Processors Association; Proceedings of the Sixty-First Annual Convention; 1982; 11 pages.
Wankat, Phillip C.; "Chapter 3: Introduction to Column Distillation"; Separation Process Engineering; Second Ed.; Pearson Education, Inc.; 2007; 23 pages.
Radebaugh, Ray; "Cryogenic Technology Resources, About Cryogenics"; The MacMillan Encyclopedia of Chemistry; New York; 2002; 4 pages.
Kirk-Othmer; "Petroleum"; Kirk-Othmer Encyclopedia of Chemical Technology; Fifth Ed.; vol. 18; 2006; 16 pages.
Morrison, Robert Thornton, et al.; "Chapter 3: Alkanes, Free-Radical Substitution"; Organic Chemistry; Fourth Ed.; 1987; 45 pages.
Perry, Robert H., et al.; "Section 14: Gas Absorption and Gas-Liquid System Design"; Perry's Chemical Engineers' Handbook; Seventh Ed.; Aug. 1997; 23 pages.
Depriester, C. L.; "Light-Hydrocarbon Vapor-Liquid Distribution Coefficients, Pressure-Temperature-Composition Charts and Pressure-Temperature Nomographs"; Applied Thermodynamics; American Institute of Chemical Engineers; vol. 49, No. 7; 1953; 45 pages.
Schlumberger Limited; "Natural Gas Liquids"; Energy Glossary; https://glossary.slb.com/en/terms/n/natural_gas_liquids; Retrieved Jan. 16, 2024; Case No. IPR2024-00385; Exhibit 1023; 2 pages.
Diener, Ralf, et al.; "Sizing of Throttling Device for Gas/Liquid Two-Phase Flow Part 1: Safety Valves"; Process Safety Progress; vol. 23, No. 4; Dec. 2004; 10 pages.

(56) References Cited

OTHER PUBLICATIONS

Flynn, A. J .; "Wasson Denver Unit—CO2 Treatment"; Gas Processors Association; Proceedings of the Sixty-Second Annual Convention; San Francisco, California; Mar. 14-16, 1983; 15 pages.
Final Office Action dated Apr. 23, 2024; U.S. Appl. No. 17/402,158, filed Aug. 13, 2021; 22 pages.
"Plaintiffs Pilot Energy Solutions, LLC and Pilot Intellectual Property, LLC's Original Complaint"; Civil Action No. 4:23-cv-02505; U.S. District Court Southern District of Texas Houston Division; Jul. 7, 2023; 80 pages.
"Defendants Chevron U.S.A. Inc. and Scout Energy Management, LLC's Motion To Dismiss for Failure to State a Claim Under FRCP 12(B)(6)"; Civil Action No. 4:23-cv-02505; U.S. District Court Southern District of Texas Houston Division; Oct. 2, 2023; 20 pages.
"Plaintiffs' Response in Opposition to Defendants' Motion to Dismiss for Failure to State a Claim Under FRCP 12(B)(6)"; Civil Action No. 4:23-cv-02505-AHB; U.S. District Court Southern District of Texas Houston Division; Oct. 25, 2023; 27 pages.
"Defendants Chevron U.S.A. Inc. and Scout Energy Management, LLC's Reply in Support of Motion to Dismiss for Failure to State a Claim Under Frcp 12(B)(6)"; Civil Action No. 4:23-cv-02505; U.S. District Court Southern District of Texas Houston Division; Nov. 1, 2023; 6 pages.
*Scout Energy Management, LLC, and Chevron U.S.A. Inc.*, Petitioner v. *Pilot Intellectual Property, LLC*, Patent Owner; "Notice of Filing Date Accorded to Petition and Time for Filing Patent Owner Preliminary Response"; Case No. IPR2024-00385; Feb. 12, 2024; 6 pages.
*Scout Energy Management, LLC, and Chevron U.S.A. Inc.*, Petitioner v. *Pilot Intellectual Property, LLC*, Patent Owner; "Patent Owner's Mandatory Notices Pursuant to 37 C.F.R. § 42.8(a)(2)"; Case No. IPR2024-00385; Feb. 13, 2024; 6 pages.
*Scout Energy Management, LLC, and Chevron U.S.A. Inc.*, Petitioners v. *Pilot Intellectual Property, LLC*, Patent Owner; "Patent Owner's Preliminary Response"; Case No. IPR2024-00385; May 13, 2024; 76 pages.
*Scout Energy Management, LLC, and Chevron U.S.A. Inc.*, Petitioners v. *Pilot Intellectual Property, LLC*, Patent Owner; "Declaration of Trevor Bors"; Case No. IPR2024-00385; May 13, 2024; 86 pages.
"Curriculum Vitae of Trevor Bors"; Exhibit 2002, Petition for Inter Partes Review of U.S. Pat. No. 8,505,332, Case No. IPR2024-00385; May 13, 2024; 4 pages.
"Table of Similarities"; Exhibit 2004, Petition for Inter Partes Review of U.S. Pat. No. 8,505,332, Case No. IPR2024-00385; May 13, 2024; 10 pages.
Gas Processors Suppliers Association; "Engineering Data Book"; FPS Version; vols. I & II, Sections 1-26; 2004; 300 pages.
Holmes, A. S., et al.; "Process Improves Acid Gas Separation"; Hydrocarbon Processing; May 1982; 8 pages.
Kent-Webb, Hannah; "Best Practices for Biological Sample Storage and Management"; Biocompare; Oct. 6, 2022; 2 pages.
Nash, J. M.; "Vortex Expansion Devices for High Temperature Cryogenics"; Proceedings of the 26th Intersociety Energy Conversion Engineering Conference; 1991; 1 page.
*Scout Energy Management, LLC, and Chevron U.S.A. Inc.*, Petitioners v. *Pilot Intellectual Property, LLC*, Patent Owner; "Patent Owner's Updated Mandatory Notices Pursuant to 37 C.F.R. § 42.8(a)(2)"; Case No. IPR2024-00385; Jun. 10, 2024; 7 pages.
*Scout Energy Management, LLC, and Chevron U.S.A. Inc.*, Petitioners v. *Pilot Intellectual Property, LLC*, Patent Owner; "Patent Owner's Updated Exhibit List"; Case No. IPR2024-00385; Jun. 10, 2024; 6 pages.
Penflex; "Engineering Bulletin"; Exhibit 2011, Petition for Inter Partes Review of U.S. Pat. No. 8,505,332, Case No. IPR2024-00385; Jun. 10, 2024; 3 pages.
Welsh, Jenn, et al.; "Hydrate Formation in Chevron Mabee Unit for NGL Recovery and CO2 Purification for EOR"; Gas Processors Association; 2017; 10 pages.
"Prosecution History of Canadian Patent No. 2,949,039"; Exhibit 2013; Petition for Inter Partes Review, U.S. Pat. No. 8,505,332, Case No. IPR2024-00385; Jun. 10, 2024; pp. 1-200.
"Prosecution History of Canadian Patent No. 2,949,039"; Exhibit 2013; Petition for Inter Partes Review, U.S. Pat. No. 8,505,332, Case No. IPR2024-00385; Jun. 10, 2024; pp. 201-401.
*Scout Energy Management, LLC, and Chevron U.S.A. Inc.*, Petitioners v. *Pilot Intellectual Property, LLC*, Patent Owner; "Petitioners' Reply to Patent Owner's Preliminary Response"; Case No. IPR2024-00385; Jun. 13, 2024; 13 pages.
Advisory Action dated Jul. 9, 2024; U.S. Appl. No. 17/402,158, filed Aug. 13, 2021; 4 pages.
Office Action dated Sep. 10, 2024; U.S. Appl. No. 17/402,158, filed Aug. 13, 2021; 27 pages.

\* cited by examiner

CARBON DIOXIDE RECYCLE STREAM PROCESSING WITH ETHYLENE GLYCOL DEHYDRATING IN AN ENHANCED OIL RECOVERY PROCESS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Carbon dioxide ($CO_2$) is a naturally occurring substance in most hydrocarbon subterranean formations. Carbon dioxide may also be used for recovering or extracting oil and hydrocarbons from subterranean formations. One carbon dioxide based recovery process involves injecting carbon dioxide into an injection well and recovering heavy hydrocarbons and perhaps some of the carbon dioxide from at least one recovery well. Carbon dioxide reinjection process may also produce natural gas liquids (NGLs).

SUMMARY

In one aspect, the disclosure includes a set of process equipment for use in an enhanced oil recovery process. The set of process equipment comprises an ethylene glycol dehydrator, an ethylene glycol regeneration system, and a natural gas liquids recovery column. The ethylene glycol dehydrator is configured to receive a first carbon dioxide recycle stream from a hydrocarbon formation, where the first carbon dioxide recycle stream comprises water, carbon dioxide, natural gas, and natural gas liquids, add ethylene glycol to the first carbon dioxide recycle stream to produce an ethylene glycol and carbon dioxide recycle stream, condense the ethylene glycol and carbon dioxide stream to produce a multiphase stream, and separate the multiphase stream into a water and ethylene glycol stream and a second carbon dioxide recycle stream, where the water and ethylene glycol stream comprises the water and the ethylene glycol, and where the second carbon dioxide recycle stream comprises the carbon dioxide, the natural gas, and the natural gas liquids. The ethylene glycol regeneration system is configured to receive the water and ethylene glycol stream from the ethylene glycol dehydrator, separate the water and ethylene glycol stream into a water stream and an ethylene glycol stream, and transfer the ethylene glycol stream to the ethylene glycol dehydrator. The natural gas liquids recovery column is configured to receive the second carbon dioxide recycle stream from the ethylene glycol dehydrator and separate the second carbon dioxide recycle steam into a carbon dioxide reinjection stream and a natural gas liquids stream.

In another aspect, the disclosure includes a method for carbon dioxide recycle stream processing with ethylene glycol dehydrating in an enhanced oil recovery process. The method comprises receiving a first carbon dioxide recycle stream from a hydrocarbon formation, where the first carbon dioxide recycle stream comprises water, carbon dioxide, natural gas, and natural gas liquids, adding ethylene glycol to the first carbon dioxide recycle stream to produce an ethylene glycol and carbon dioxide recycle stream, condensing the ethylene glycol and carbon dioxide stream to produce a multiphase stream, separating the multiphase stream into a water and ethylene glycol stream and a second carbon dioxide recycle stream, where the water and ethylene glycol stream comprises the water and the ethylene glycol, and where the second carbon dioxide recycle stream comprises the carbon dioxide, the natural gas, and the natural gas liquids, separating the water and ethylene glycol stream into a water stream and an ethylene glycol stream, and separating the second carbon dioxide recycle steam into a carbon dioxide reinjection stream and a natural gas liquids stream.

In yet another aspect, the disclosure includes an ethylene glycol dehydrator for use in an enhanced oil recovery process. The ethylene glycol dehydrator comprises an ethylene glycol injector, a condenser, and a multiphase separator. The ethylene glycol injector is configured to receive a first carbon dioxide recycle stream from a hydrocarbon formation, where the first carbon dioxide recycle stream comprises water, carbon dioxide, natural gas, and natural gas liquids, receive an ethylene glycol stream from an ethylene glycol regeneration system, where the ethylene glycol stream comprises ethylene glycol, and aerosolize the ethylene glycol stream to add the ethylene glycol stream to the first carbon dioxide recycle stream to produce an ethylene glycol and carbon dioxide recycle stream. The condenser is configured to receive the ethylene glycol and carbon dioxide recycle stream from the ethylene glycol injector and condense the ethylene glycol and carbon dioxide recycle stream to produce a multiphase stream. The multiphase separator is configured to receive the multiphase stream from the condenser, separate the multiphase stream to produce a water and ethylene glycol stream and a second carbon dioxide recycle stream, transfer the water and ethylene glycol stream to the ethylene glycol regeneration system, and transfer the second carbon dioxide recycle stream to a natural gas liquids recovery column.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a NGL recovery process that may be implemented as part of a carbon dioxide reinjection process to recover NGLs from a carbon dioxide recycle stream. When implementing a carbon dioxide reinjection process, the carbon dioxide is typically injected downhole into an injection well and a stream comprising hydrocarbons and carbon dioxide is generally recovered from a recovery well. The carbon dioxide may be separated from the heavy hydrocarbons and then recycled downhole, e.g. in the reinjection well. In some cases, the carbon dioxide recycle stream may comprise some NGLs, which may be recovered prior to injecting the carbon dioxide recycle stream downhole. The NGL recovery process may be optimized by weighing the NGL recovery rate against the amount of energy expended on NGL recovery.

Figure 1:
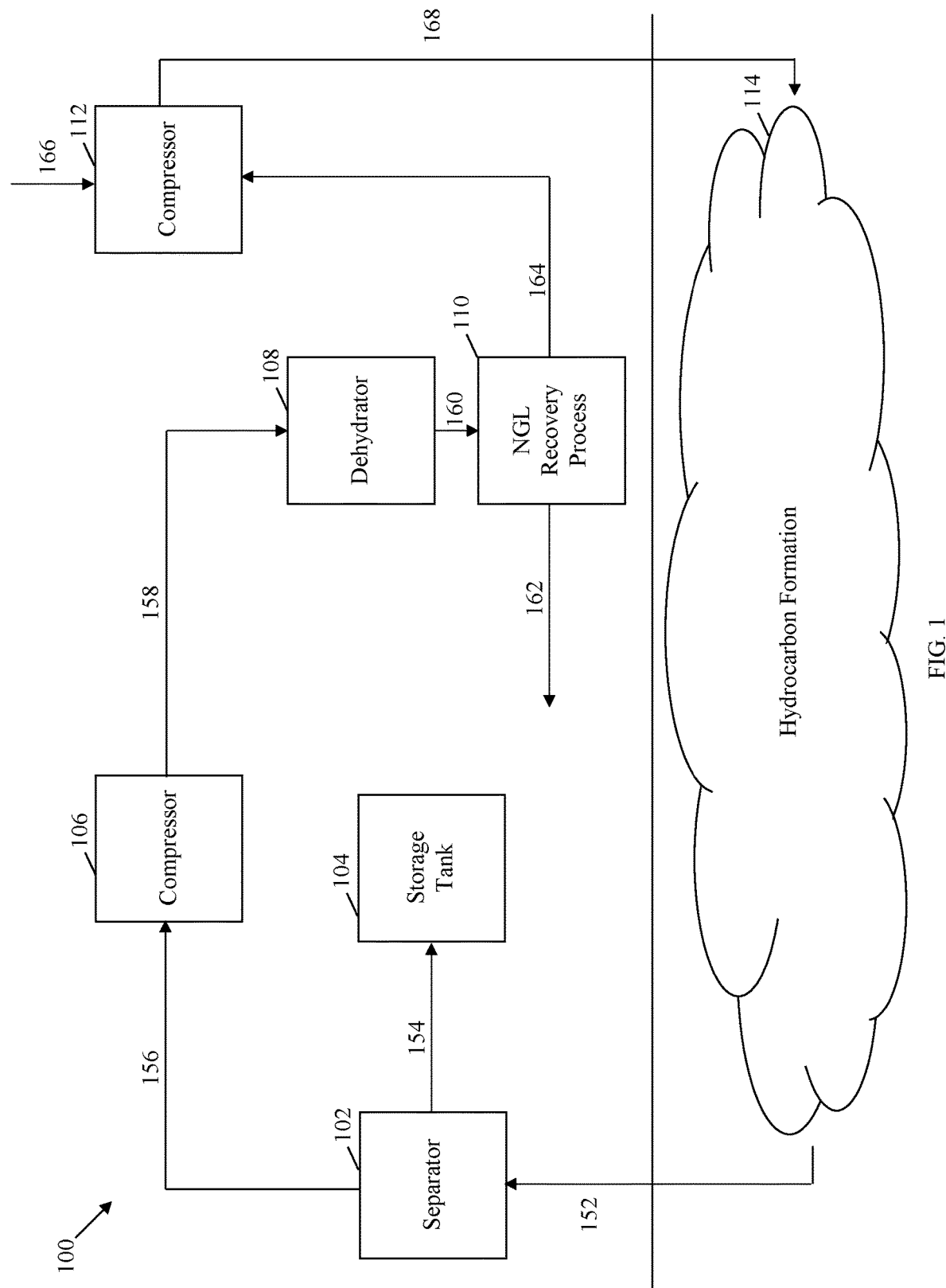
FIG. 1 is a process flow diagram for an embodiment of a carbon dioxide reinjection process.

FIG. 1 illustrates an embodiment of a carbon dioxide reinjection process 100. The carbon dioxide reinjection process 100 may receive hydrocarbons and carbon dioxide from a subterranean formation 114, separate heavy hydrocarbons and some of the NGLs from the carbon dioxide, and inject the carbon dioxide downhole. As shown in FIG. 1, additional process steps may be included in the carbon dioxide reinjection process, such as compressing the carbon dioxide, dehydrating the carbon dioxide, and/or adding additional carbon dioxide to the carbon dioxide recycle stream. The specific steps in the carbon dioxide reinjection process 100 are explained in further detail below.

The carbon dioxide reinjection process 100 may receive a hydrocarbon feed stream 152 from a subterranean formation 114. The hydrocarbon feed stream 152 may be obtained from at least one recovery well as indicated by the upward arrow in FIG. 1, but may also be obtained from other types of wells. In addition, the hydrocarbon feed stream 152 may be obtained from the subterranean formation 114 using any suitable method. For example, if a suitable pressure differential exists between the subterranean formation 114 and the surface, the hydrocarbon feed stream 152 may flow to the surface via the pressure differential. Alternatively, surface and/or downhole pumps may be used to draw the hydrocarbon feed stream 152 from the subterranean formation 114 to the surface.

Although the composition of the hydrocarbon feed stream 152 will vary from one location to another, the hydrocarbon feed stream 152 may comprise carbon dioxide, methane, ethane, NGLs, heavy hydrocarbons, hydrogen sulfide ($H_2S$), helium, nitrogen, water, or combinations thereof. The term "hydrocarbon" may refer to any compound comprising, consisting essentially of, or consisting of carbon and hydrogen atoms. The term "natural gas" may refer to any hydrocarbon that may exist in a gas phase under atmospheric or downhole conditions, and includes methane and ethane, but may also include diminishing amounts of $C_3$-$C_8$ hydrocarbons. The term "natural gas liquids" or NGLs may refer to natural gases that may be liquefied without refrigeration, and may include $C_3$-$C_8$ hydrocarbons. Both natural gas and NGL are terms known in the art and are used herein as such. In contrast, the term "heavy hydrocarbons" may refer to any hydrocarbon that may exist in a liquid phase under atmospheric or downhole conditions, and generally includes liquid crude oil, which may comprise $C_{9+}$ hydrocarbons, branched hydrocarbons, aromatic hydrocarbons, and combinations thereof.

The hydrocarbon feed stream 152 may enter a separator 102. The separator 102 may be any process equipment suitable for separating at least one inlet stream into a plurality of effluent streams having different compositions, states, temperatures, and/or pressures. For example, the separator 102 may be a column having trays, packing, or some other type of complex internal structure. Examples of such columns include scrubbers, strippers, absorbers, adsorbers, packed columns, and distillation columns having valve, sieve, or other types of trays. Such columns may employ weirs, downspouts, internal baffles, temperature control elements, and/or pressure control elements. Such columns may also employ some combination of reflux condensers and/or reboilers, including intermediate stage condensers and reboilers. Alternatively, the separator 102 may be a phase separator, which is a vessel that separates an inlet stream into a substantially vapor stream and a substantially liquid stream, such as a knock-out drum, flash drum, reboiler, condenser, or other heat exchanger. Such vessels may also have some internal baffles, temperature control elements, and/or pressure control elements, but generally lack any trays or other type of complex internal structure commonly found in columns. The separator 102 may also be any other type of separator, such as a membrane separator. In a specific embodiment, the separator 102 is a knockout drum. Finally, the separator 102 may be any combination of the aforementioned separators 102 arranged in series, in parallel, or combinations thereof.

The separator 102 may produce a heavy hydrocarbon stream 154 and a carbon dioxide recycle stream 156. The heavy hydrocarbon stream 154 may comprise most of the heavy hydrocarbons from the hydrocarbon feed stream 152. In embodiments, the heavy hydrocarbon stream 154 may comprise at least about 90 percent, at least about 95 percent, at least about 99 percent, or substantially all of the heavy hydrocarbons from the hydrocarbon feed stream 152. The heavy hydrocarbon stream 154 may be sent to a pipeline for transportation or a storage tank 104, where it is stored until transported to another location or further processed. In contrast, the carbon dioxide recycle stream 156 may comprise most of the carbon dioxide from the hydrocarbon feed stream 152. In embodiments, the carbon dioxide recycle stream 156 may comprise at least about 90 percent, at least about 95 percent, at least about 99 percent, or substantially all of the carbon dioxide from the hydrocarbon feed stream 152. Similarly, the carbon dioxide recycle stream 156 may comprise at least about 80 percent, at least about 90 percent, at least about 95 percent, or substantially all of the natural gas from the hydrocarbon feed stream 152. All of the percentages referred to herein are molar percentages until otherwise specified.

The carbon dioxide recycle stream 156 may enter a compressor 106. The compressor 106 may be any process equipment suitable for increasing the pressure, temperature, and/or density of an inlet stream. The compressor 106 may be configured to compress a substantially vapor phase inlet stream, a substantially liquid phase inlet stream, or combinations thereof. As such, the term "compressor" may include both compressors and pumps, which may be driven by electrical, mechanical, hydraulic, or pneumatic means. Specific examples of suitable compressors 106 include centrifugal, axial, positive displacement, turbine, rotary, and reciprocating compressors and pumps. In a specific embodiment, the compressor 106 is a turbine compressor. Finally, the compressor 106 may be any combination of the aforementioned compressors 106 arranged in series, in parallel, or combinations thereof.

The compressor 106 may produce a compressed carbon dioxide recycle stream 158. The compressed carbon dioxide recycle stream 158 may contain the same composition as the carbon dioxide recycle stream 156, but at a higher energy level. The additional energy in the compressed carbon dioxide recycle stream 158 may be obtained from energy added to the compressor 106, e.g. the electrical, mechanical, hydraulic, or pneumatic energy. In embodiments, difference in energy levels between the compressed carbon dioxide recycle stream 158 and the carbon dioxide recycle stream 156 is at least about 50 percent, at least about 65 percent, or at least about 80 percent of the energy added to the compressor 106.

The compressed carbon dioxide recycle stream 158 may enter a dehydrator 108. The dehydrator 108 may remove some or substantially all of the water from the compressed carbon dioxide recycle stream 158. The dehydrator 108 may be any suitable dehydrator, such as a condenser, an absorber, or an adsorber. Specific examples of suitable dehydrators 108 include refrigerators, molecular sieves, liquid desiccants such as glycol, solid desiccants such as silica gel or calcium chloride, and combinations thereof. The dehydrator 108 may also be any combination of the aforementioned dehydrators 108 arranged in series, in parallel, or combinations thereof. In a specific embodiment, the dehydrator 108 is a glycol unit. Any water accumulated within or exiting from the dehydrator 108 may be stored, used for other processes, or discarded.

The dehydrator 108 may produce a dehydrated carbon dioxide recycle stream 160. The dehydrated carbon dioxide recycle stream 160 may contain little water, e.g. liquid water or water vapor. In embodiments, the dehydrated carbon dioxide recycle stream 160 may comprise no more than about 5 percent, no more than about 3 percent, no more than about 1 percent, or be substantially free of water.

Figure 2:
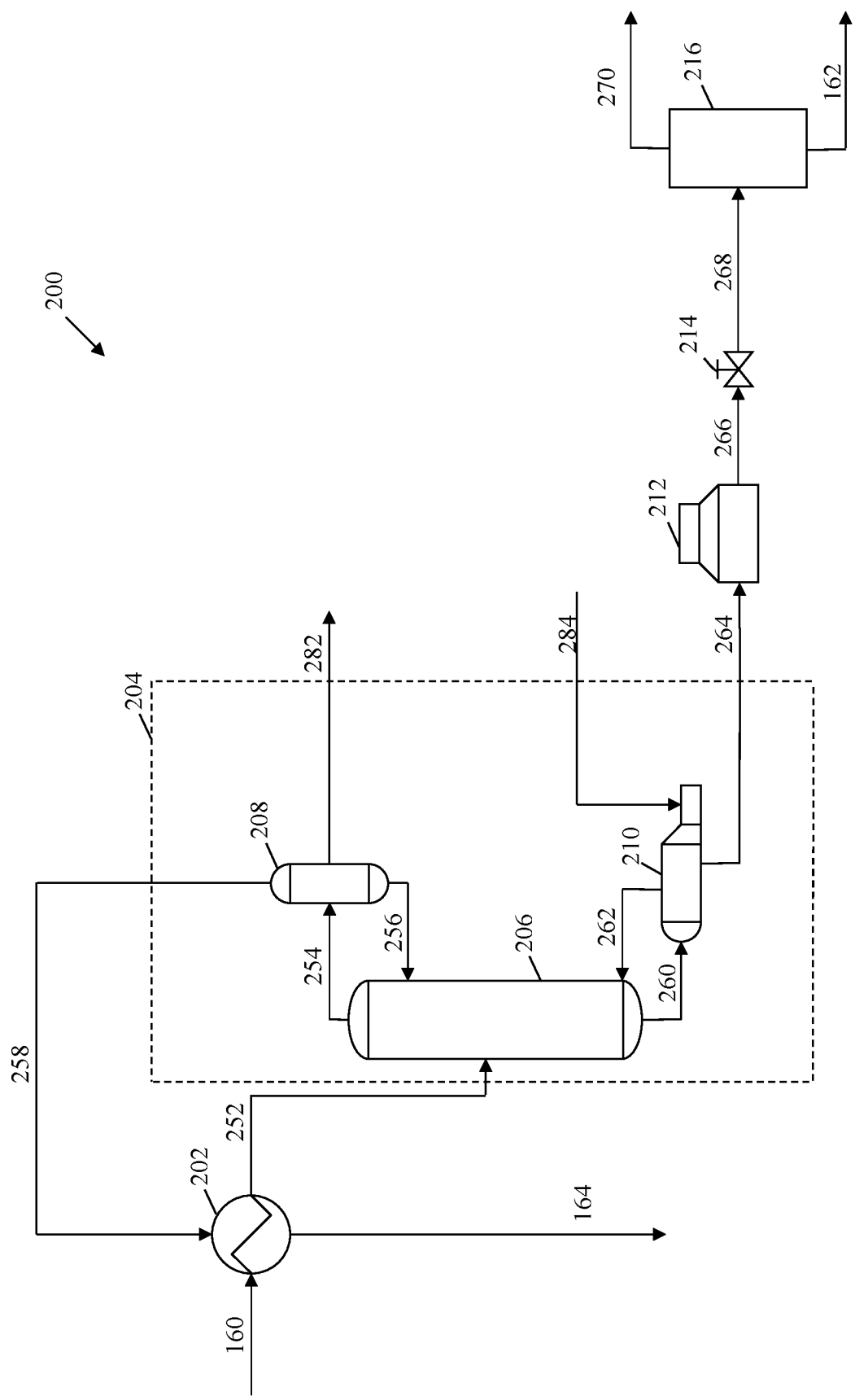
FIG. 2 is a schematic diagram of an embodiment of a NGL recovery process.

The dehydrated carbon dioxide recycle stream 160 may enter a NGL recovery process 110. The NGL recovery process 110 may separate the dehydrated carbon dioxide recycle stream 160 into a NGL rich stream 162 and a purified carbon dioxide recycle stream 164. The NGL rich stream 162 may only comprise a portion of the total NGLs from the dehydrated carbon dioxide recycle stream 160. For example, the NGL rich stream 162 may comprise less than about 70 percent, from about 10 percent to about 50 percent, or from about 20 percent to about 35 percent of the NGLs from the dehydrated carbon dioxide recycle stream 160. By taking a less aggressive cut of the NGLs and/or disregarding the recovery of methane, ethane, and optionally propane from the dehydrated carbon dioxide recycle stream 160, the NGL recovery process 110 may produce a relatively high quality NGL rich stream 162 with relatively little process equipment or energy. A specific example of a suitable NGL recovery process 110 is shown in FIG. 2 and described in further detail below.

As mentioned above, the NGL recovery process 110 may produce a relatively high-quality NGL rich stream 162. Specifically, while the NGL recovery process 110 recovers only a portion, e.g., about 20 to about 35 percent, of the NGLs in the dehydrated carbon dioxide recycle stream 160, the resulting NGL rich stream 162 is relatively lean with respect to methane, ethane, and acid gases. For example, the NGL rich stream 162 may comprise most of the butane and heavier components from the dehydrated carbon dioxide recycle stream 160. For example, the NGL rich stream 162 may comprise at least about 90 percent, at least about 95 percent, at least about 99 percent, or substantially all of the $C_{4+}$ from the dehydrated carbon dioxide recycle stream 160. In embodiments, the NGL rich stream 162 may comprise no more than about 10 percent, no more than about 5 percent, no more than about 1 percent, or be substantially free of ethane. Similarly, the NGL rich stream 162 may comprise no more than about 5 percent, no more than about 3 percent, no more than about 1 percent, or be substantially free of methane. Moreover, the NGL rich stream 162 may comprise no more than about 5 percent, no more than about 3 percent, no more than about 1 percent, or be substantially free of acid gases, such as carbon dioxide or hydrogen sulfide. It will be realized that the composition of the NGL rich stream 162 may be dependent on the dehydrated carbon dioxide recycle stream 160 composition. The examples provided below show the composition of the NGL rich stream 162 for three different dehydrated carbon dioxide recycle stream 160 compositions. The NGL rich stream 162 may be sent to a pipeline for transportation or a storage tank, where it is stored until transported to another location or further processed.

As mentioned above, the NGL recovery process 110 may produce a purified carbon dioxide recycle stream 164. The purified carbon dioxide recycle stream 164 may comprise most of the carbon dioxide from the dehydrated carbon dioxide recycle stream 160, as well as some other components such as methane, ethane, propane, butane, nitrogen, and hydrogen sulfide. In embodiments, the purified carbon dioxide recycle stream 164 may comprise at least about 90 percent, at least about 95 percent, at least about 99 percent, or substantially all of the carbon dioxide from the dehydrated carbon dioxide recycle stream 160. In addition, the purified carbon dioxide recycle stream 164 may comprise at least about 90 percent, at least about 95 percent, at least about 99 percent, or substantially all of the methane from the dehydrated carbon dioxide recycle stream 160. As such, the purified carbon dioxide recycle stream 164 may comprise at least about 65 percent, at least about 80 percent, at least about 90 percent, or at least about 95 percent carbon dioxide. In embodiments, the purified carbon dioxide recycle stream 164 may comprise no more than about 10 percent, no more than about 5 percent, no more than about 1 percent, or be substantially free of $C_{3+}$. Similarly, the purified carbon dioxide recycle stream 164 may comprise no more than about 20 percent, no more than about 10 percent, no more than about 5 percent, or be substantially free of $C_{2+}$.

The purified carbon dioxide recycle stream 164 may enter a compressor 112. The compressor 112 may comprise one or more compressors, such as the compressor 106 described above. In a specific embodiment, the compressor 112 is a turbine compressor. The compressor 112 may compress the purified carbon dioxide recycle stream 164, thereby producing a carbon dioxide injection stream 168. The carbon dioxide injection stream 168 may contain the same composition as the purified carbon dioxide recycle stream 164, but at a higher energy level. The additional energy in the carbon dioxide injection stream 168 may be obtained from energy added to the compressor 112, e.g. the electrical, mechanical, hydraulic, or pneumatic energy. In embodiments, difference in energy levels between the carbon dioxide injection stream 168 and the purified carbon dioxide recycle stream 164 is at least about 50 percent, at least about 65 percent, or at least about 80 percent of the energy added to the compressor 112.

In some embodiments, a makeup stream 166 may be combined with either the purified carbon dioxide recycle stream 164 or the carbon dioxide injection stream 168. Specifically, as the carbon dioxide reinjection process 100 is operated, carbon dioxide and other compounds will be lost, e.g. by replacing the hydrocarbons in the subterranean formation 114, by leakage into inaccessible parts of the subterranean formation 114, and/or to other causes. Alternatively, it may be desirable to increase the amount of carbon dioxide and other compounds injected downhole. As such, the makeup stream 166 may be combined with either the purified carbon dioxide recycle stream 164 and/or the carbon dioxide injection stream 168, for example in the compressor 112. Alternatively or additionally, the makeup stream 166 may be combined with the carbon dioxide recycle stream 156, the compressed carbon dioxide recycle stream 158, the dehydrated carbon dioxide recycle stream 160, or combinations thereof. The makeup stream 166 may comprise carbon dioxide, nitrogen, methane, ethane, air, water, or any other suitable compound. In an embodiment, the makeup stream 166 comprises at least 75 percent, at least 85 percent, or at least 95 percent carbon dioxide, nitrogen, methane, air, water, or combinations thereof.

FIG. 2 illustrates an embodiment of a NGL recovery process 200. The NGL recovery process 200 may recover some of the NGLs from a carbon dioxide recycle stream described above. For example, the NGL recovery process 200 may be implemented as part of the carbon dioxide reinjection process 100, e.g. by separating the dehydrated carbon dioxide recycle stream 160 into a NGL rich stream 162 and a purified carbon dioxide recycle stream 164.

The NGL recovery process 200 may begin by cooling the dehydrated carbon dioxide recycle stream 160 in a heat exchanger 202. The heat exchanger 202 may be any equipment suitable for heating or cooling one stream using another stream. Generally, the heat exchanger 202 is a relatively simple device that allows heat to be exchanged between two fluids without the fluids directly contacting each other. Examples of suitable heat exchangers 202 include shell and tube heat exchangers, double pipe heat exchangers, plate fin heat exchangers, bayonet heat exchangers, reboilers, condensers, evaporators, and air coolers. In the case of air coolers, one of the fluids is atmospheric air, which may be forced over tubes or coils using one or more fans. In a specific embodiment, the heat exchanger 202 is a shell and tube heat exchanger.

As shown in FIG. 2, the dehydrated carbon dioxide recycle stream 160 may be cooled using the cooled, purified carbon dioxide recycle stream 258. Specifically, the dehydrated carbon dioxide recycle stream 160 is cooled to produce the cooled carbon dioxide recycle stream 252, and the cooled, purified carbon dioxide recycle stream 258 is heated to produce the purified carbon dioxide recycle stream 164. The efficiency of the heat exchange process depends on several factors, including the heat exchanger design, the temperature, composition, and flowrate of the hot and cold streams, and/or the amount of thermal energy lost in the heat exchange process. In embodiments, the difference in energy levels between the dehydrated carbon dioxide recycle stream 160 and the cooled carbon dioxide recycle stream 252 is at least about 60 percent, at least about 70 percent, at least about 80 percent, or at least about 90 percent of the difference in energy levels between the cooled, purified carbon dioxide recycle stream 258 and the purified carbon dioxide recycle stream 164.

The cooled carbon dioxide recycle stream 252 then enters a NGL stabilizer 204. The NGL stabilizer 204 may comprise a separator 206, a condenser 208, and a reboiler 210. The separator 206 may be similar to any of the separators described herein, such as separator 102. In a specific embodiment, the separator 206 is a distillation column. The condenser 208 may receive an overhead 254 from the separator 206 and produce the cooled, purified carbon dioxide recycle stream 258 and a reflux stream 256, which is returned to the separator 206. The condenser 208 may be similar to any of the heat exchangers described herein, such as heat exchanger 202. In a specific embodiment, the condenser 208 is a shell and tube, kettle type condenser coupled to a refrigeration process, and contains a reflux accumulator. As such, the condenser 208 may remove some energy 282 from the reflux stream 256 and cooled, purified carbon dioxide recycle stream 258, typically by refrigeration. The cooled, purified carbon dioxide recycle stream 258 is substantially similar in composition to the purified carbon dioxide recycle stream 164 described above. Similarly, the reboiler 210 may receive a bottoms stream 260 from the separator 206 and produce a sour NGL rich stream 264 and a boil-up stream 262, which is returned to the separator 206. The reboiler 210 may be like any of the heat exchangers described herein, such as heat exchanger 202. In a specific embodiment, the reboiler 210 is a shell and tube heat exchanger coupled to a hot oil heater. As such, the reboiler 210 adds some energy 284 to the boil-up stream 262 and the sour NGL rich stream 264, typically by heating. The sour NGL rich stream 264 may be substantially similar in composition to the NGL rich stream 162, with the exception that the sour NGL rich stream 264 has some additional acid gases, e.g. acid gases 270 described below.

The sour NGL rich stream 264 may then be cooled in another heat exchanger 212. The heat exchanger 212 may be like any of the heat exchangers described herein, such as heat exchanger 202. For example, the heat exchanger 212 may be an air cooler as described above. A cooled, sour NGL rich stream 266 exits the heat exchanger 212 and enters a throttling valve 214. The throttling valve 214 may be an actual valve such as a gate valve, globe valve, angle valve, ball valve, butterfly valve, needle valve, or any other suitable valve, or may be a restriction in the piping such as an orifice or a pipe coil, bend, or size reduction. The throttling valve 214 may reduce the pressure, temperature, or both of the cooled, sour NGL rich stream 266 and produce a low-pressure sour NGL rich stream 268. The cooled, sour NGL rich stream 266 and the low-pressure sour NGL rich stream 268 have substantially the same composition as the sour NGL rich stream 264, albeit with lower energy levels.

The low-pressure sour NGL rich stream 268 may then be sweetened in a separator 216. The separator 216 may be similar to any of the separators described herein, such as separator 102. In an embodiment, the separator 216 may be one or more packed columns that use a sweetening process to remove acid gases from the low-pressure sour NGL rich stream 268. Suitable sweetening processes include amine solutions, physical solvents such as SELEXOL or RECTISOL, mixed amine solution and physical solvents, potassium carbonate solutions, direct oxidation, absorption, adsorption using, e.g., molecular sieves, or membrane filtration. The separator 216 may produce the NGL rich stream 162 described above. In addition, any acid gases 270 accumulated within or exiting from the separator 216 may be stored, used for other processes, or suitably disposed of. Finally, while FIGS. 1 and 2 are described in the context of carbon dioxide reinjection, it will be appreciated that the concepts described herein can be applied to other reinjection processes, for example those using nitrogen, air, or water.

Figure 3:
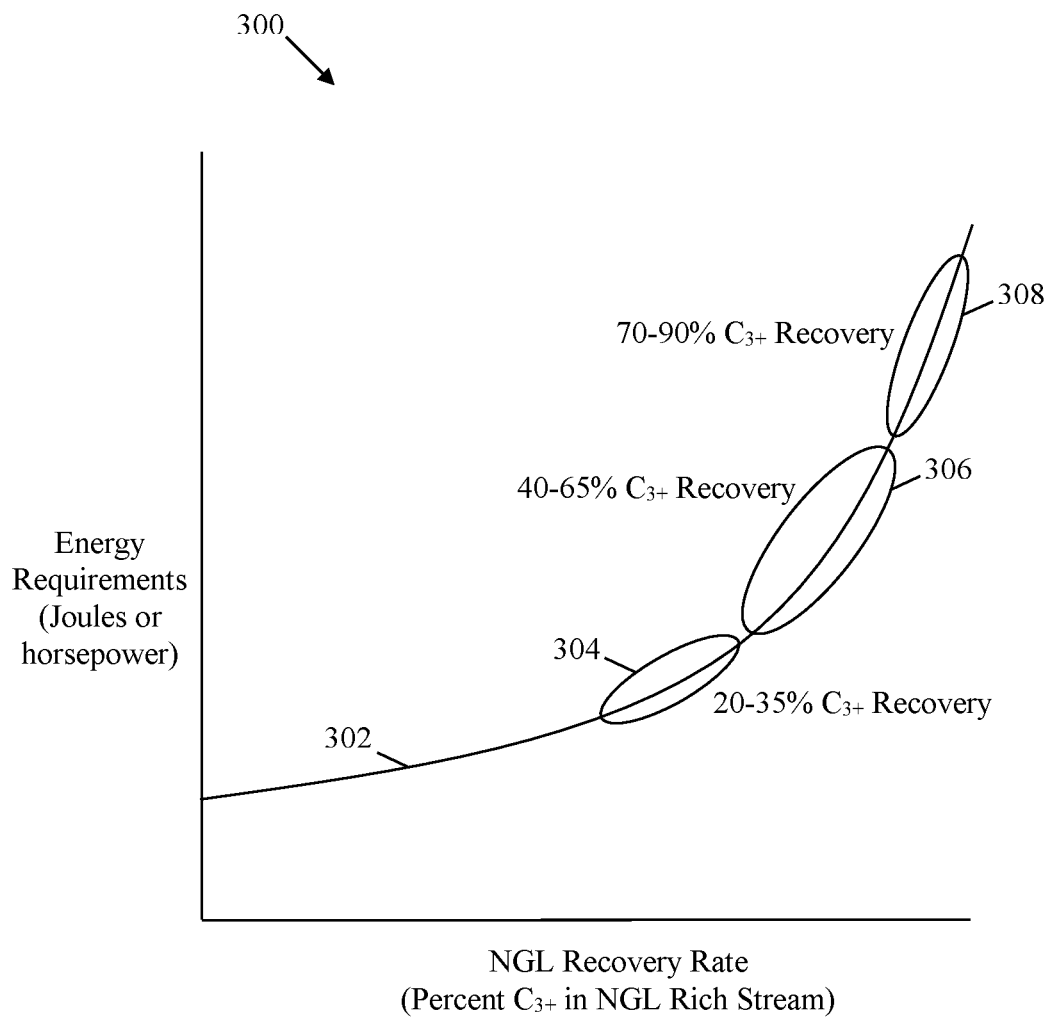
FIG. 3 is a chart depicting an embodiment of the relationship between the NGL recovery rate and the energy requirement.

FIG. 3 illustrates an embodiment of a chart 300 depicting the relationship between the NGL recovery rate and the energy expended to recover NGLs in the NGL recovery process. The NGL recovery rate may be a percentage recovery, and may represent the amount of $C_{3+}$ in the carbon dioxide recycle stream that is recovered in the NGL rich stream. The energy requirement may be measured in joules (J) or in horsepower (hp), and may represent the energy required to generate the condenser energy and reboiler energy described above. If additional compressors are needed at any point in the carbon dioxide reinjection process than would be required in an otherwise similar carbon dioxide reinjection process that lacks the NGL recovery process, then the energy required to operate such compressors may be included in the energy requirement shown in FIG. 3.

As shown by curve 302, the energy requirements may increase about exponentially as the NGLs are recovered at higher rates. In other words, substantially higher energy may be required to recover the NGLs at incrementally higher rates. For example, recovering a first amount 304 of from about 20 percent to about 35 percent of $C_{3+}$ may require substantially less energy than recovering a second amount 306 of from about 40 percent to about 65 percent of $C_{3+}$. Moreover, recovering the second amount 306 of from about 40 percent to about 65 percent of $C_{3+}$ may require substantially less energy than recovering a third amount 308 of from about 70 percent to about 90 percent of $C_{3+}$. Such significant reduction in energy requirements may be advantageous in terms of process feasibility and cost, where relatively small decreases in NGL recovery rates may require significantly less energy and process equipment, yielding significantly better process economics. Although the exact relationship of the curve 302 may depend on numerous factors especially the price of $C_{3+}$, in an embodiment the economics of the NGL recovery process when the NGL recovery rate is in the second amount 306 may be better than the economics of the NGL recovery process when the NGL recovery rate is in the third amount 308. Similarly, the economics of the NGL recovery process when the NGL recovery rate is in the first amount 304 may be significantly better than the economics of the NGL recovery process when the NGL recovery rate is in the second amount 306. Such a relationship is counterintuitive considering that in many other processes, the process economics generally improve with increased recovery rates.

Figure 4:
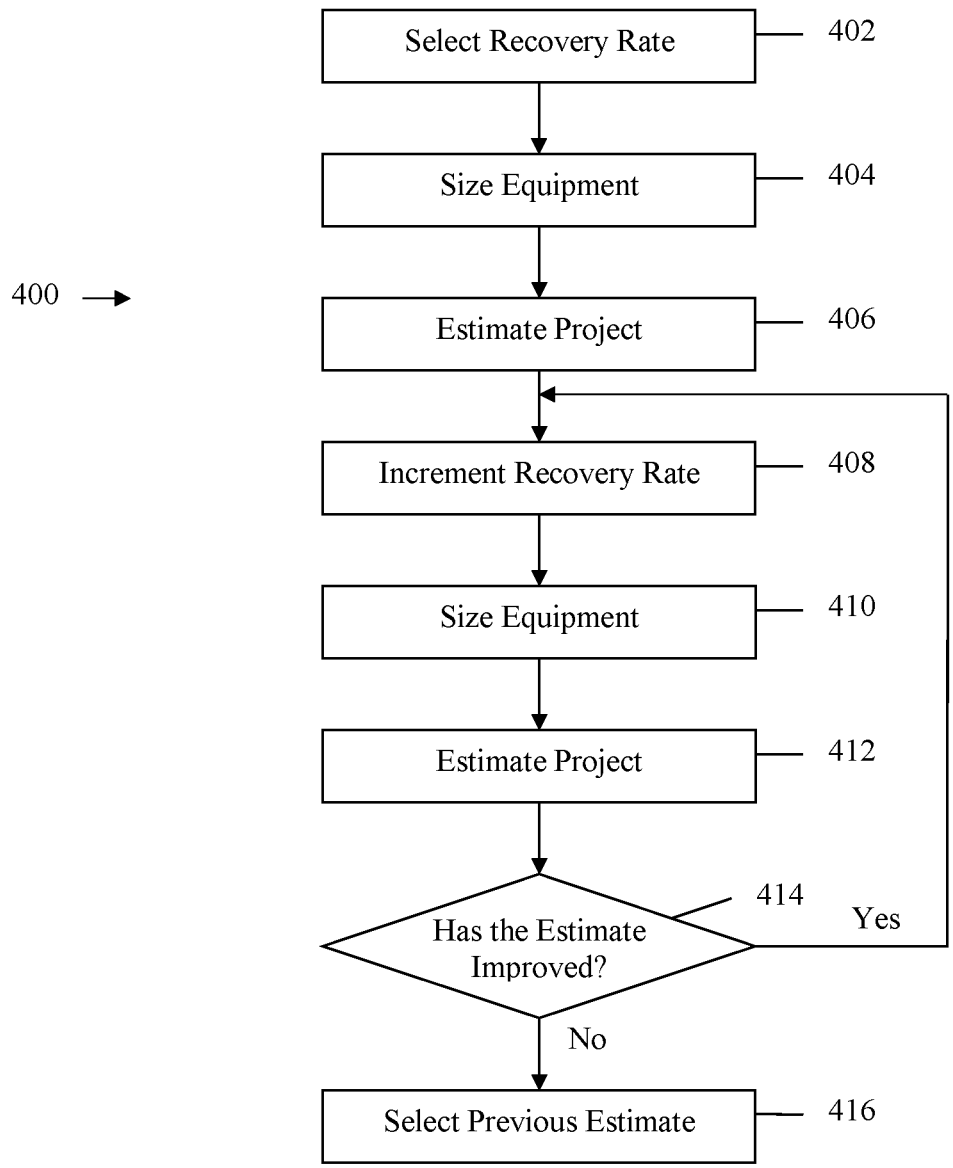
FIG. 4 is a flowchart of an embodiment of a NGL recovery optimization method.

FIG. 4 illustrates an embodiment of a NGL recovery optimization method 400. The NGL recovery optimization method 400 may be used to determine an improved or optimal project estimate for implementing the NGL recovery process and recovering NGLs at a suitable rate. As such, the NGL recovery process may be configured using appropriate equipment design based on the NGL recovery rate. Specifically, the NGL recovery optimization method 400 may design or configure the equipment size, quantity, or both based on an initial NGL recovery rate and required energy, and hence estimate the project feasibility and cost. The method 400 may upgrade or improve the project estimate by iteratively incrementing the initial NGL recovery rate, re-estimating the project, and comparing the two estimates.

At block 402, the method 400 may select an initial NGL recovery rate. The initial NGL recovery rate may be relatively small, such as no more than about 20 percent recovery, no more than about 10 percent recovery, no more than about 5 percent recovery, or no more than about 1 percent recovery. Choosing the initial NGL recovery rate at a small percentage of the total NGL amount may result in a relatively low project estimate that may be increased gradually to reach improved estimates.

The method 400 may then proceed to block 404, where the project equipment size may be determined based on the initial NGL recovery rate. Specifically, the size of the equipment described in the NGL recovery process and any additional compressors as described above may be determined. In addition, the pressure and temperature ratings and material compositions of such equipment may be determined at block 404, if desired.

The method 400 may then proceed to block 406, where the project may be estimated. Project estimation may comprise an economic evaluation of the NGL recovery process, and may include the cost of obtaining, fabricating, and/or field constructing the equipment sized in block 404. In addition, project estimation may include the cost of operating and maintaining the NGL process, as well as the revenue generated by the sale or use of the products obtained by implementing the NGL process. As such, the project estimate may comprise the total project benefits (including production, sales, etc.) minus the total project capital and operating costs (including cost, equipment, etc.). In some embodiments, the project estimate may be based on an existing carbon dioxide reinjection plant that lacks the NGL recovery process.

The method 400 may then proceed to block 408, where the recovery rate is incremented. The NGL recovery rate may be incremented by a relatively small percentage, for example no more than about 10 percent, not more than about 5 percent, or no more than about 1 percent. The method 400 may then proceed to block 410, which is substantially similar to block 404. The method 400 may then proceed to block 412, which is substantially similar to block 406.

The method 400 may then proceed to block 414, where the method 400 may determine whether the project estimate has improved. For instance, the method 400 may compare the project estimate from block 412 with the previous project estimate (either block 406 or the previous iteration of block 412) and determine whether the revised estimate is more economically desirable. The method 400 may return to block 408 when the condition at block 414 is met. Otherwise, the method 400 may proceed to block 416.

At block 416, the method 400 may choose the previous project estimate as the final estimate. For example, the method 400 may select the previous NGL recovery rate (either block 406 or the previous iteration of block 412) instead of the estimate obtained at block 412. In some embodiments, the desired or optimum recovery rate selected at block 416 may represent a range of desirable or optimum points, as opposed to a single point. Accordingly, the method 400 may select the equipment sizing corresponding to the selected NGL recovery rate. The selected project estimate and sizing may then be used for the NGL recovery process. Of course, it will be appreciated that the method 400 may be revised to include a decremented, top-down estimation approach as opposed to an incremented, bottom-up estimation approach.

The method 400 may have several advantages over other project estimation methods. For example, process equipment of a specific size may be selected, and the corresponding recovery rate determined. Alternatively, a required recovery rate may be selected, and the equipment sized to achieve the recovery rate. However, it has been discovered that such approaches are inflexible and often yields suboptimal process economics. For example, relatively high NGL recovery rates will not lead to an improvement in process economics, e.g. because of the exponential increase in energy consumption. In contrast, the method 400 provides a flexible approach to determining a desirable or optimal project estimate.

In an embodiment, the equipment size may be configured to allow for variations in recovery rates to accommodate changes in economic conditions, such as $C_{3+}$ or energy pricing. Specifically, the equipment described herein can be sized above or below the desired or optimum amount to allow the processes described herein to operate at recovery rates slightly greater than or slightly less than the desirable or optimum point obtained in method 400. As the process parameters and the energy requirements may be closely related, the ability of the process to continue to successfully operate under differing conditions may be reflected by constrained changes in the energy requirements of the process. When operating in the first amount 304 or the second amount 306 on the curve 302 in FIG. 3, significant increases or decreases in NGL recovery rate may be obtained with little change in the energy requirements. Such is not the case when operating in the third amount 308 on the curve 302 in FIG. 3, where significant increases or decreases in energy requirements yield only incremental changes in NGL recovery rate.

EXAMPLES

In one example, a process simulation was performed using the NGL recovery process 200 shown in FIG. 2. The simulation was performed using the Hyprotech Ltd. HYSYS Process v2.1.1 (Build 3198) software package. The NGL recovery process 200 separated the dehydrated carbon dioxide recycle stream 160 into the purified carbon dioxide recycle stream 164, the NGL rich stream 162, and the acid gas stream 270. The specified values are indicated by an asterisk (*). The physical properties are provided in degrees Fahrenheit (F.), pounds per square inch gauge (psig), million standard cubic feet per day (MMSCFD), pounds per hour (lb/hr), U.S. gallons per minute (USGPM), and British thermal units per hour (Btu/hr). The material streams, their compositions, and the associated energy streams produced by the simulation are provided in tables 1, 2, and 3 below, respectively.

TABLE 1A

Material Streams

| Name | Dehydrated $CO_2$ Recycle Stream 160 | Cooled $CO_2$ Recycle Stream 252 | Cooled, Purified $CO_2$ Recycle Stream 258 |
|---|---|---|---|
| Vapor Fraction | 0.9838 | 0.9392 | 1.0000 |
| Temperature (F.) | 104.0* | 45.00* | 4.011 |
| Pressure (psig) | 340.0* | 335.0 | 330.0 |
| Molar Flow (MMSCFD) | 17.00* | 17.00 | 15.88 |
| Mass Flow (lb/hr) | 8.049e+04 | 8.049e+04 | 7.254e+04 |
| Liquid Volume Flow (USGPM) | 218.1 | 218.1 | 192.3 |
| Heat Flow (Btu/hr) | −2.639e+08 | −2.658e+08 | −2.577e+08 |

TABLE 1B

Material Streams

| Name | Purified $CO_2$ Recycle Stream 164 | Sour NGL Rich Stream 264 | Cooled Sour NGL Rich Stream 266 |
|---|---|---|---|
| Vapor Fraction | 1.0000 | 0.00000 | 0.0000 |
| Temperature (F.) | 97.39 | 202.6 | 120.0* |
| Pressure (psig) | 325.0 | 340.0 | 635.3* |
| Molar Flow (MMSCFD) | 15.88 | 1.119 | 1.119 |
| Mass Flow (lb/hr) | 7.254e+04 | 7947 | 7947 |
| Liquid Volume Flow (USGPM) | 192.3 | 25.84 | 25.84 |
| Heat Flow (Btu/hr) | −2.558e+08 | −8.443e+06 | −8.862e+06 |

TABLE 1C

Material Streams

| Name | Low-Pressure Sour NGL Rich Stream 268 | Acid Gas Stream 270 | NGL Rich Stream 162 |
|---|---|---|---|
| Vapor Fraction | 0.0000 | 1.0000 | 0.0000 |
| Temperature (F.) | 120.9 | 100.0* | 111.8 |
| Pressure (psig) | 200.3* | 5.304* | 185.3* |
| Molar Flow (MMSCFD) | 1.119 | 0.1030 | 1.016 |
| Mass Flow (lb/hr) | 7947 | 446.4 | 7501 |
| Liquid Volume Flow (USGPM) | 25.84 | 1.100 | 24.74 |
| Heat Flow (Btu/hr) | −8.862e+06 | −1.083e+06 | −7.779e+06 |

TABLE 2A

Stream Compositions

| Name | Dehydrated $CO_2$ Recycle Stream 160 | Cooled $CO_2$ Recycle Stream 252 | Cooled, Purified $CO_2$ Recycle Stream 258 |
|---|---|---|---|
| Comp Mole Frac ($H_2S$) | 0.0333* | 0.0333 | 0.0327 |
| Comp Mole Frac (Nitrogen) | 0.0054* | 0.0054 | 0.0058 |
| Comp Mole Frac ($CO_2$) | 0.7842* | 0.7842 | 0.8359 |
| Comp Mole Frac (Methane) | 0.0521* | 0.0521 | 0.0558 |
| Comp Mole Frac (Ethane) | 0.0343* | 0.0343 | 0.0348 |
| Comp Mole Frac (Propane) | 0.0406* | 0.0406 | 0.0313 |
| Comp Mole Frac (i-Butane) | 0.0072* | 0.0072 | 0.0022 |
| Comp Mole Frac (n-Butane) | 0.0171* | 0.0171 | 0.0015 |
| Comp Mole Frac (i-Pentane) | 0.0058* | 0.0058 | 0.0000 |
| Comp Mole Frac (n-Pentane) | 0.0057* | 0.0057 | 0.0000 |
| Comp Mole Frac (n-Hexane) | 0.0070* | 0.0070 | 0.0000 |
| Comp Mole Frac (n-Octane) | 0.0071* | 0.0071 | 0.0000 |
| Comp Mole Frac ($H_2O$) | 0.0000* | 0.0000 | 0.0000 |

TABLE 2B

Stream Compositions

| Name | Purified $CO_2$ Recycle Stream 164 | Sour NGL Rich Stream 264 | Cooled Sour NGL Rich Stream 266 |
|---|---|---|---|
| Comp Mole Frac ($H_2S$) | 0.0327 | 0.0421 | 0.0421 |
| Comp Mole Frac (Nitrogen) | 0.0058 | 0.0000 | 0.0000 |
| Comp Mole Frac ($CO_2$) | 0.8359 | 0.0500 | 0.0500 |
| Comp Mole Frac (Methane) | 0.0558 | 0.0000 | 0.0000 |
| Comp Mole Frac (Ethane) | 0.0348 | 0.0281 | 0.0281 |
| Comp Mole Frac (Propane) | 0.0313 | 0.1728 | 0.1728 |
| Comp Mole Frac (i-Butane) | 0.0022 | 0.0789 | 0.0789 |
| Comp Mole Frac (n-Butane) | 0.0015 | 0.2388 | 0.2388 |
| Comp Mole Frac (i-Pentane) | 0.0000 | 0.0887 | 0.0887 |
| Comp Mole Frac (n-Pentane) | 0.0000 | 0.0866 | 0.0866 |
| Comp Mole Frac (n-Hexane) | 0.0000 | 0.1063 | 0.1063 |
| Comp Mole Frac (n-Octane) | 0.0000 | 0.1077 | 0.1077 |
| Comp Mole Frac ($H_2O$) | 0.0000 | 0.0000 | 0.0000 |

TABLE 2C

Stream Compositions

| Name | Low-Pressure Sour NGL Rich Stream 268 | Acid Gas Stream 270 | NGL Rich Stream 162 |
|---|---|---|---|
| Comp Mole Frac ($H_2S$) | 0.0421 | 0.4568 | 0.0000 |
| Comp Mole Frac (Nitrogen) | 0.0000 | 0.0000 | 0.0000 |
| Comp Mole Frac ($CO_2$) | 0.0500 | 0.5432 | 0.0000 |

TABLE 2C-continued

Stream Compositions

| Name | Low-Pressure Sour NGL Rich Stream 268 | Acid Gas Stream 270 | NGL Rich Stream 162 |
|---|---|---|---|
| Comp Mole Frac (Methane) | 0.0000 | 0.0000 | 0.0000 |
| Comp Mole Frac (Ethane) | 0.0281 | 0.0000 | 0.0309 |
| Comp Mole Frac (Propane) | 0.1728 | 0.0000 | 0.1903 |
| Comp Mole Frac (i-Butane) | 0.0789 | 0.0000 | 0.0869 |
| Comp Mole Frac (n-Butane) | 0.2388 | 0.0000 | 0.2630 |
| Comp Mole Frac (i-Pentane) | 0.0887 | 0.0000 | 0.0977 |
| Comp Mole Frac (n-Pentane) | 0.0866 | 0.0000 | 0.0954 |
| Comp Mole Frac (n-Hexane) | 0.1063 | 0.0000 | 0.1171 |
| Comp Mole Frac (n-Octane) | 0.1077 | 0.0000 | 0.1186 |
| Comp Mole Frac ($H_2O$) | 0.0000 | 0.0000 | 0.0000 |

TABLE 3

Energy Streams

| Name | Heat Flow (Btu/hr) |
|---|---|
| Condenser Q Energy Stream 282 | 1.469e+06 |
| Reboiler Q Energy Stream 284 | 1.152e+06 |

In another example, the process simulation was repeated using a different dehydrated carbon dioxide recycle stream 160. The material streams, their compositions, and the associated energy streams produced by the simulation are provided in tables 4, 5, and 6 below, respectively.

TABLE 4A

Material Streams

| Name | Dehydrated $CO_2$ Recycle Stream 160 | Cooled $CO_2$ Recycle Stream 252 | Cooled, Purified $CO_2$ Recycle Stream 258 |
|---|---|---|---|
| Vapor Fraction | 0.9874 | 0.9286 | 1.0000 |
| Temperature (F.) | 104.0* | 60.00* | 22.77 |
| Pressure (psig) | 685.3* | 680.3 | 590.0 |
| Molar Flow (MMSCFD) | 20.00* | 20.00 | 18.86 |
| Mass Flow (lb/hr) | 8.535e+04 | 8.535e+04 | 7.780e+04 |
| Liquid Volume Flow (USGPM) | 258.0 | 258.0 | 232.2 |
| Heat Flow (Btu/hr) | −2.741e+08 | −2.760e+08 | −2.683e+08 |

TABLE 4B

Material Streams

| Name | Purified $CO_2$ Recycle Stream 164 | Sour NGL Rich Stream 264 | Cooled Sour NGL Rich Stream 266 |
|---|---|---|---|
| Vapor Fraction | 1.0000 | 0.00000 | 0.0000 |
| Temperature (F.) | 87.48 | 290.7 | 120.0* |
| Pressure (psig) | 585.0 | 600.0 | 635.3* |
| Molar Flow (MMSCFD) | 18.86 | 1.139 | 1.139 |
| Mass Flow (lb/hr) | 7.780e+04 | 7552 | 7552 |
| Liquid Volume Flow (USGPM) | 232.2 | 25.83 | 25.83 |
| Heat Flow (Btu/hr) | −2.663e+08 | −7.411e+06 | −8.371e+06 |

TABLE 4C

Material Streams

| Name | Low-Pressure Sour NGL Rich Stream 268 | Acid Gas Stream 270 | NGL Rich Stream 162 |
|---|---|---|---|
| Vapor Fraction | 0.0000 | 1.0000 | 0.0000 |
| Temperature (F.) | 120.5 | 100.0* | 118.6 |
| Pressure (psig) | 200.3* | 5.304* | 185.3* |
| Molar Flow (MMSCFD) | 1.139 | 0.02943 | 1.110 |
| Mass Flow (lb/hr) | 7552 | 141.2 | 7411 |
| Liquid Volume Flow (USGPM) | 25.83 | 0.3421 | 25.49 |
| Heat Flow (Btu/hr) | −8.371e+06 | −5.301e+05 | −7.841e+06 |

TABLE 5A

Stream Compositions

| Name | Dehydrated $CO_2$ Recycle Stream 160 | Cooled $CO_2$ Recycle Stream 252 | Cooled, Purified $CO_2$ Recycle Stream 258 |
|---|---|---|---|
| Comp Mole Frac ($H_2S$) | 0.0004* | 0.0004 | 0.0004 |
| Comp Mole Frac (Nitrogen) | 0.0153* | 0.0153 | 0.0162 |
| Comp Mole Frac ($CO_2$) | 0.6592* | 0.6592 | 0.6975 |
| Comp Mole Frac (Methane) | 0.1813* | 0.1813 | 0.1922 |
| Comp Mole Frac (Ethane) | 0.0620* | 0.0620 | 0.0620 |
| Comp Mole Frac (Propane) | 0.0411* | 0.0411 | 0.0275 |
| Comp Mole Frac (i-Butane) | 0.0064* | 0.0064 | 0.0017 |
| Comp Mole Frac (n-Butane) | 0.0179* | 0.0179 | 0.0024 |
| Comp Mole Frac (i-Pentane) | 0.0040* | 0.0040 | 0.0000 |
| Comp Mole Frac (n-Pentane) | 0.0049* | 0.0049 | 0.0000 |
| Comp Mole Frac (n-Hexane) | 0.0030* | 0.0030 | 0.0000 |
| Comp Mole Frac (n-Octane) | 0.0045* | 0.0045 | 0.0000 |
| Comp Mole Frac ($H_2O$) | 0.0000* | 0.0000 | 0.0000 |

TABLE 5B

Stream Compositions

| Name | Purified $CO_2$ Recycle Stream 164 | Sour NGL Rich Stream 264 | Cooled Sour NGL Rich Stream 266 |
|---|---|---|---|
| Comp Mole Frac ($H_2S$) | 0.0004 | 0.0008 | 0.0008 |
| Comp Mole Frac (Nitrogen) | 0.0162 | 0.0000 | 0.0000 |
| Comp Mole Frac ($CO_2$) | 0.6975 | 0.0250 | 0.0250 |
| Comp Mole Frac (Methane) | 0.1922 | 0.0000 | 0.0000 |
| Comp Mole Frac (Ethane) | 0.0620 | 0.0613 | 0.0613 |
| Comp Mole Frac (Propane) | 0.0275 | 0.2670 | 0.2670 |
| Comp Mole Frac (i-Butane) | 0.0017 | 0.0836 | 0.0836 |
| Comp Mole Frac (n-Butane) | 0.0024 | 0.2751 | 0.2751 |
| Comp Mole Frac (i-Pentane) | 0.0000 | 0.0697 | 0.0697 |
| Comp Mole Frac (n-Pentane) | 0.0000 | 0.0858 | 0.0858 |
| Comp Mole Frac (n-Hexane) | 0.0000 | 0.0527 | 0.0527 |
| Comp Mole Frac (n-Octane) | 0.0000 | 0.0790 | 0.0790 |
| Comp Mole Frac ($H_2O$) | 0.0000 | 0.0000 | 0.0000 |

TABLE 5C

Stream Compositions

| Name | Low-Pressure Sour NGL Rich Stream 268 | Acid Gas Stream 270 | NGL Rich Stream 162 |
|---|---|---|---|
| Comp Mole Frac ($H_2S$) | 0.0008 | 0.0315 | 0.0000 |
| Comp Mole Frac (Nitrogen) | 0.0000 | 0.0000 | 0.0000 |
| Comp Mole Frac ($CO_2$) | 0.0250 | 0.9685 | 0.0000 |

TABLE 5C-continued

Stream Compositions

| Name | Low-Pressure Sour NGL Rich Stream 268 | Acid Gas Stream 270 | NGL Rich Stream 162 |
|---|---|---|---|
| Comp Mole Frac (Methane) | 0.0000 | 0.0000 | 0.0000 |
| Comp Mole Frac (Ethane) | 0.0613 | 0.0000 | 0.0629 |
| Comp Mole Frac (Propane) | 0.2670 | 0.0000 | 0.2740 |
| Comp Mole Frac (i-Butane) | 0.0836 | 0.0000 | 0.0858 |
| Comp Mole Frac (n-Butane) | 0.2751 | 0.0000 | 0.2824 |
| Comp Mole Frac (i-Pentane) | 0.0697 | 0.0000 | 0.0716 |
| Comp Mole Frac (n-Pentane) | 0.0858 | 0.0000 | 0.0881 |
| Comp Mole Frac (n-Hexane) | 0.0527 | 0.0000 | 0.0541 |
| Comp Mole Frac (n-Octane) | 0.0790 | 0.0000 | 0.0811 |
| Comp Mole Frac ($H_2O$) | 0.0000 | 0.0000 | 0.0000 |

TABLE 6

Energy Streams

| Name | Heat Flow (Btu/hr) |
|---|---|
| Condenser Q Energy Stream 282 | 1.884e+06 |
| Reboiler Q Energy Stream 284 | 2.211e+06 |

In a third example, the process simulation was repeated using a different dehydrated carbon dioxide recycle stream 160. The material streams, their compositions, and the associated energy streams produced by the simulation are provided in tables 7, 8, and 9 below, respectively.

TABLE 7A

Material Streams

| Name | Dehydrated $CO_2$ Recycle Stream 160 | Cooled $CO_2$ Recycle Stream 252 | Cooled, Purified $CO_2$ Recycle Stream 258 |
|---|---|---|---|
| Vapor Fraction | 1.0000 | 0.9988 | 1.0000 |
| Temperature (F.) | 104.0* | 30.00* | 4.617 |
| Pressure (psig) | 340.0* | 335.0 | 330.0 |
| Molar Flow (MMSCFD) | 17.00* | 17.00 | 16.82 |
| Mass Flow (lb/hr) | 8.083e+04 | 8.083e+04 | 7.968e+04 |
| Liquid Volume Flow (USGPM) | 203.4 | 203.4 | 199.5 |
| Heat Flow (Btu/hr) | −3.016e+08 | −3.032e+08 | −3.025e+08 |

TABLE 7B

Material Streams

| Name | Purified $CO_2$ Recycle Stream 164 | Sour NGL Rich Stream 264 | Cooled Sour NGL Rich Stream 266 |
|---|---|---|---|
| Vapor Fraction | 1.0000 | 0.00000 | 0.0000 |
| Temperature (F.) | 76.45 | 199.4 | 120.0* |
| Pressure (psig) | 325.0 | 340.0 | 635.3* |
| Molar Flow (MMSCFD) | 16.82 | 0.1763 | 0.1763 |
| Mass Flow (lb/hr) | 7.968e+04 | 1153 | 1153 |
| Liquid Volume Flow (USGPM) | 199.5 | 3.894 | 3.894 |
| Heat Flow (Btu/hr) | −3.009e+08 | −1.278e+06 | −1.340e+06 |

TABLE 7C

Material Streams

| Name | Low-Pressure Sour NGL Rich Stream 268 | Acid Gas Stream 270 | NGL Rich Stream 162 |
|---|---|---|---|
| Vapor Fraction | 0.0000 | 1.0000 | 0.0000 |
| Temperature (F.) | 120.4 | 100.0* | 115.4 |
| Pressure (psig) | 200.3* | 5.304* | 185.3* |
| Molar Flow (MMSCFD) | 0.1763 | 0.01048 | 0.1659 |
| Mass Flow (lb/hr) | 1153 | 48.82 | 1105 |
| Liquid Volume Flow (USGPM) | 3.894 | 0.1188 | 3.776 |
| Heat Flow (Btu/hr) | −1.340e+06 | −1.653e+05 | −1.175e+06 |

TABLE 8A

Stream Compositions

| Name | Dehydrated $CO_2$ Recycle Stream 160 | Cooled $CO_2$ Recycle Stream 252 | Cooled, Purified $CO_2$ Recycle Stream 258 |
|---|---|---|---|
| Comp Mole Frac ($H_2S$) | 0.0031* | 0.0031 | 0.0030 |
| Comp Mole Frac (Nitrogen) | 0.0008* | 0.0008 | 0.0008 |
| Comp Mole Frac ($CO_2$) | 0.9400* | 0.9400 | 0.9493 |
| Comp Mole Frac (Methane) | 0.0219* | 0.0219 | 0.0222 |
| Comp Mole Frac (Ethane) | 0.0156* | 0.0156 | 0.0157 |
| Comp Mole Frac (Propane) | 0.0116* | 0.0116 | 0.0088 |
| Comp Mole Frac (i-Butane) | 0.0015* | 0.0015 | 0.0002 |
| Comp Mole Frac (n-Butane) | 0.0031* | 0.0031 | 0.0001 |
| Comp Mole Frac (i-Pentane) | 0.0007* | 0.0007 | 0.0000 |
| Comp Mole Frac (n-Pentane) | 0.0006* | 0.0006 | 0.0000 |
| Comp Mole Frac (n-Hexane) | 0.0005* | 0.0005 | 0.0000 |
| Comp Mole Frac (n-Octane) | 0.0006* | 0.0006 | 0.0000 |
| Comp Mole Frac ($H_2O$) | 0.0000* | 0.0000 | 0.0000 |

TABLE 8B

Stream Compositions

| Name | Purified $CO_2$ Recycle Stream 164 | Sour NGL Rich Stream 264 | Cooled Sour NGL Rich Stream 266 |
|---|---|---|---|
| Comp Mole Frac ($H_2S$) | 0.0030 | 0.0094 | 0.0094 |
| Comp Mole Frac (Nitrogen) | 0.0008 | 0.0000 | 0.0000 |
| Comp Mole Frac ($CO_2$) | 0.9493 | 0.0500 | 0.0500 |
| Comp Mole Frac (Methane) | 0.0222 | 0.0000 | 0.0000 |
| Comp Mole Frac (Ethane) | 0.0157 | 0.0000 | 0.0000 |
| Comp Mole Frac (Propane) | 0.0088 | 0.2794 | 0.2794 |
| Comp Mole Frac (i-Butane) | 0.0002 | 0.1265 | 0.1265 |
| Comp Mole Frac (n-Butane) | 0.0001 | 0.2985 | 0.2985 |
| Comp Mole Frac (i-Pentane) | 0.0000 | 0.0713 | 0.0713 |
| Comp Mole Frac (n-Pentane) | 0.0000 | 0.0617 | 0.0617 |
| Comp Mole Frac (n-Hexane) | 0.0000 | 0.0482 | 0.0482 |
| Comp Mole Frac (n-Octane) | 0.0000 | 0.0550 | 0.0550 |
| Comp Mole Frac ($H_2O$) | 0.0000 | 0.0000 | 0.0000 |

TABLE 8C

Stream Compositions

| Name | Low-Pressure Sour NGL Rich Stream 268 | Acid Gas Stream 270 | NGL Rich Stream 162 |
|---|---|---|---|
| Comp Mole Frac ($H_2S$) | 0.0094 | 0.1584 | 0.0000 |
| Comp Mole Frac (Nitrogen) | 0.0000 | 0.0000 | 0.0000 |
| Comp Mole Frac ($CO_2$) | 0.0500 | 0.8416 | 0.0000 |

TABLE 8C-continued

Stream Compositions

| Name | Low-Pressure Sour NGL Rich Stream 268 | Acid Gas Stream 270 | NGL Rich Stream 162 |
|---|---|---|---|
| Comp Mole Frac (Methane) | 0.0000 | 0.0000 | 0.0000 |
| Comp Mole Frac (Ethane) | 0.0000 | 0.0000 | 0.0000 |
| Comp Mole Frac (Propane) | 0.2794 | 0.0000 | 0.2970 |
| Comp Mole Frac (i-Butane) | 0.1265 | 0.0000 | 0.1345 |
| Comp Mole Frac (n-Butane) | 0.2985 | 0.0000 | 0.3174 |
| Comp Mole Frac (i-Pentane) | 0.0713 | 0.0000 | 0.0758 |
| Comp Mole Frac (n-Pentane) | 0.0617 | 0.0000 | 0.0656 |
| Comp Mole Frac (n-Hexane) | 0.0482 | 0.0000 | 0.0512 |
| Comp Mole Frac (n-Octane) | 0.0550 | 0.0000 | 0.0584 |
| Comp Mole Frac ($H_2O$) | 0.0000 | 0.0000 | 0.0000 |

TABLE 9

Energy Streams

| Name | Heat Flow (Btu/hr) |
|---|---|
| Condenser Q Energy Stream 282 | 6.236e+06 |
| Reboiler Q Energy Stream 284 | 5.666e+06 |

It should be highlighted that in at least certain embodiments that streams in a NGL recovery system (e.g., a hydrocarbon feed stream, a carbon dioxide recycle stream, and/or a NGL rich stream) are not subjected to cryogenic conditions, membranes, and/or carbon dioxide recovery solvents between being received and being separated into output streams (e.g., a heavy hydrocarbon rich stream, a purified carbon dioxide recycle stream, a NGL rich stream, and/or an acid gas stream). For instance, other recovery systems may use a carbon dioxide recovery solvent to separate carbon dioxide from a stream (e.g., use a carbon dioxide recovery solvent to absorb/dissolve carbon dioxide from a stream comprising both hydrocarbons and carbon dioxide).

Furthermore, it should also be highlighted that some embodiments may use a dehydration solvent to remove water (e.g., liquid water or water vapor) despite optionally not using a carbon dioxide recovery solvent. For example, in certain circumstances, an incoming feed stream may be "wet" in that it contains some amount of water vapor. In such cases, a dehydration solvent such as, but not limited to, triethylene glycol (TEG), diethylene glycol (DEG), ethylene glycol (MEG), tetraethylene glycol (TREG), other glycols, or any other dehydration solvent may be used to remove the water from the stream. However, embodiments are not limited to any particular method of dehydrating a stream and other methods of dehydrating a stream can be used as well.

As used herein, the term consisting essentially of excludes additional equilibrium-staged separation or reaction processes, but does not exclude additional piping, accumulators, heat exchangers, pipe tees and similar "simple" separations, valves, sensors, material transfer devices, or anything else that does not materially change the inherent properties of a significant portion of the streams in question.

Figure 5:
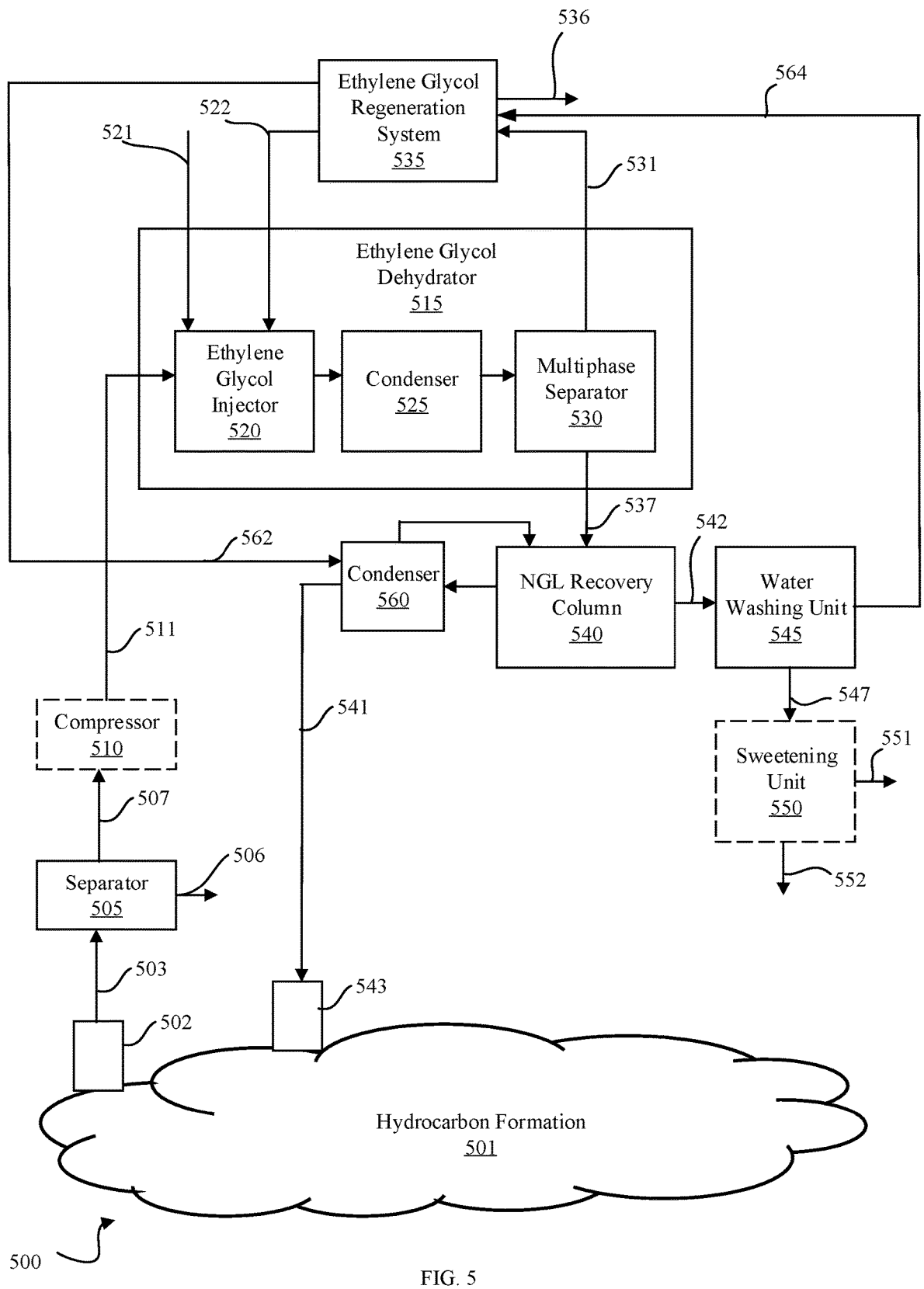
FIG. 5 is a schematic diagram of an embodiment of a set of process equipment for use in an enhanced oil recovery process that uses ethylene glycol dehydration.

FIG. 5 is a schematic diagram of an embodiment of a set of process equipment 500 for use in an enhanced oil recovery process that uses ethylene glycol dehydration. The set of process equipment 500 includes a separator 505 that receives a hydrocarbon stream 503 from a recovery well 502 of a hydrocarbon formation 501. The hydrocarbon stream 503 includes water, carbon dioxide, natural gas, natural gas liquids, and heavy hydrocarbons. The separator 505 receives the hydrocarbon stream 503 and separates the hydrocarbon stream 503 to produce a heavy hydrocarbon stream 506 and a carbon dioxide recycle stream 507. The heavy hydrocarbon stream 506 includes the heavy hydrocarbons, and the carbon dioxide recycle stream 507 comprises the water, the carbon dioxide, the natural gas, and the natural gas liquids.

The carbon dioxide recycle stream 507 is optionally transferred to a compressor 510 to produce a compressed carbon dioxide recycle stream 511. In some embodiments, no compression is needed, or an amount of compression needed may be less than in other approaches. For instance, the compressed carbon dioxide recycle stream 511 may only need to be compressed to a range of 100-300 psig instead of 500-700 psig needed in other approaches such as in approaches that use molecular sieve dehydration.

The compressed carbon dioxide recycle stream 511 is transferred to an ethylene glycol dehydrator 515. The ethylene glycol dehydrator 515 includes an ethylene glycol injector 520, a condenser 525, and a multiphase separator 530. The ethylene glycol injector 520 and the condenser 525 are optionally implemented as separate pieces of equipment that are coupled together or are implemented as a single piece of equipment having the functionalities of an injector and a condenser. The ethylene glycol injector 520 adds ethylene glycol (i.e., mono ethylene glycol ($C_2H_6O_2$) to the compressed carbon dioxide recycle stream 511. The added ethylene glycol prevents hydrate formation. For example, hydrates could be formed by the hydrocarbons, the water, and other materials in the process streams. The added ethylene glycol inhibits this formation. This allows for water to be condensed out of the stream to dehydrate the stream with the condenser 525. In some embodiments, the added ethylene glycol includes water. For instance, the added ethylene glycol includes 80-85 (weight/weight) % ethylene glycol and 15-20 (weight/weight) % water. The water may be useful in lowering the freezing temperature of the added ethylene glycol to prevent freezing. The added ethylene glycol is obtained from one or both of an ethylene glycol make-up stream 521 and an ethylene glycol regeneration stream 522. The ethylene glycol injector 520 comprises nozzles or other components for combining the ethylene glycol with the compressed carbon dioxide recycle stream 511. In one embodiment, nozzles aerosolize the ethylene glycol to combine it with the compressed carbon dioxide recycle stream 511.

The compressed carbon dioxide recycle stream 511 with the ethylene glycol is transferred to the condenser 525. The condenser 525 cools the incoming stream to produce a multiphase stream. For instance, the condenser 525 may condense gaseous ethylene glycol and water into an aqueous solution of ethylene glycol. The multiphase stream optionally includes an aqueous liquid phase (e.g., water and ethylene glycol), an organic liquid phase (e.g., liquid hydrocarbons), and/or an organic gas phase (e.g., carbon dioxide and gaseous hydrocarbons). In one embodiment, the condenser 525 comprises a shell and tube heat exchanger. In another embodiment in which the ethylene glycol injector 520 and the condenser 525 are implemented as one piece of equipment, the combined piece of equipment may be a shell and tube heat exchanger for condensing that also includes nozzles for adding the ethylene glycol.

The multiphase stream is transferred to the multiphase separator 530. The multiphase separator 530 optionally includes a two-phase separator or a three-phase separator. For instance, the two-phase separator separates the incoming multiphase stream into an aqueous stream and an organic stream, and the three-phase separator separates the incoming multiphase stream into an aqueous stream, an organic liquid stream, and an organic gas stream.

The multiphase separator 530 transfer an aqueous stream 531 including water and ethylene glycol to an ethylene glycol regeneration system 535. The ethylene glycol regeneration system 535 produces the ethylene glycol regeneration stream 522 and a water stream 536. The ethylene glycol regeneration stream 522 is transferred to the ethylene glycol injector 520 to be reused. The water stream 536 is discarded, reused, stored, or transferred to a wastewater system for processing.

The ethylene glycol dehydrator 515 produces a carbon dioxide recycle stream 537 that includes carbon dioxide, natural gas, and natural gas liquids. In some embodiments, the carbon dioxide recycle stream 537 also includes some water not removed by the ethylene glycol dehydrator 515 and/or acid gas such as, but not limited to, hydrogen sulfide.

The carbon dioxide recycle stream 537 is transferred to a natural gas liquids recovery column 540. The natural gas liquids recovery column 540 produces a carbon dioxide reinjection stream 541 and a natural gas liquids stream 542. The carbon dioxide reinjection stream 541 includes carbon dioxide and natural gas and is reinjected into the hydrocarbon formation 501 through a reinjection well 543.

In some embodiments, the NGL recovery column 540 includes a condenser 560. The condenser 560 receives and condenses vapor leaving the top of the NGL recovery column 540 and returns a portion of the stream back to the NGL recovery column 540. The condenser 560 may include a secondary ethylene glycol injection point 562. The secondary ethylene glycol injection point 562 may receive ethylene glycol (e.g., 80-85 (weight/weight) % ethylene glycol and 15-20 (weight/weight) % water) from the ethylene glycol regeneration system 535. The top of the NGL recovery column 540 may be a colder or a coldest point in the process. Accordingly, adding ethylene glycol at the condenser 560 can be useful in further preventing hydrate formation.

The natural gas liquids stream 542 includes natural gas liquids and may also include water, acid gas, and ethylene glycol. In an embodiment, the set of process equipment 500 may further include a water washing unit 545 and a sweetening unit 550. The water washing unit 545 may be used to remove ethylene glycol. For instance, it may be desirable to remove ethylene glycol to prevent ethylene glycol losses. Also, it may be desirable to use an amine-based sweetener (e.g., sweetening unit 550). In such a case, ethylene glycol can reduce the performance of the sweetener. The water washing unit 545 removes ethylene glycol from the natural gas liquids stream 542 to produce an ethylene glycol and water stream 546 and a sour natural gas liquids stream 547. The ethylene glycol and water stream 546 includes ethylene glycol and water, and the sour natural gas liquids stream 547 comprises natural gas liquids and acid gas. The ethylene glycol and water stream 546 may be transferred to the ethylene glycol regeneration system 535 to be regenerated.

The set of process equipment 500 may optionally include the sweetening unit 550. The sweeting unit 550 separates the sour natural gas liquids stream 547 into an acid gas stream 551 and a sweetened natural gas liquids stream 552. The acid gas stream 551 includes the acid gas (e.g., hydrogen sulfide), and the sweetened natural gas liquids stream 552 includes the natural gas liquids.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Specifically, while the process is described in terms of a continuous process, it is contemplated that the process can be implemented as a batch process. In addition, where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc. Moreover, the percentages described herein may be mole fraction, weight fraction, or volumetric fraction.

Accordingly, the scope of protection is not limited by the description set out above but is only limited by the claims that follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A set of process equipment for use in an enhanced oil recovery process, comprising:
    an ethylene glycol dehydrator configured to:
        receive a first carbon dioxide recycle stream from a hydrocarbon formation, wherein the first carbon dioxide recycle stream comprises water, carbon dioxide, natural gas, and natural gas liquids;
        add ethylene glycol to the first carbon dioxide recycle stream to produce an ethylene glycol and carbon dioxide recycle stream;
        condense the ethylene glycol and carbon dioxide stream to produce a multiphase stream; and
        separate the multiphase stream into a water and ethylene glycol stream and a second carbon dioxide recycle stream, wherein the water and ethylene glycol stream comprises the water and the ethylene glycol, and wherein the second carbon dioxide recycle stream comprises the carbon dioxide, the natural gas, and the natural gas liquids;
    an ethylene glycol regeneration system configured to:
        receive the water and ethylene glycol stream from the ethylene glycol dehydrator;
        separate the water and ethylene glycol stream into a water stream and an ethylene glycol stream; and
        transfer the ethylene glycol stream to the ethylene glycol dehydrator; and
    a natural gas liquids recovery column configured to:
        receive the second carbon dioxide recycle stream from the ethylene glycol dehydrator; and separate the second carbon dioxide recycle stream steam into a carbon dioxide reinjection stream and a natural gas liquids stream.

2. The set of process equipment of claim 1, wherein the ethylene glycol dehydrator comprises:
an ethylene glycol injector configured to:
receive the ethylene glycol stream from the ethylene glycol regeneration system; and
add the ethylene glycol stream to the first carbon dioxide recycle stream to produce the ethylene glycol and carbon dioxide recycle stream;
a condenser configured to:
receive the ethylene glycol and carbon dioxide recycle stream; and
condense the ethylene glycol and carbon dioxide recycle stream to produce the multiphase stream; and
a multiphase separator configured to:
receive the multiphase stream from the condenser; and
separate the multiphase stream to produce the water and ethylene glycol stream and the second carbon dioxide recycle stream.

3. The set of process equipment of claim 2, wherein the ethylene glycol injector comprises nozzles configured to aerosolize the ethylene glycol stream to add the ethylene glycol stream to the first carbon dioxide recycle stream.

4. The set of process equipment of claim 3, wherein the ethylene glycol injector is configured to:

receive an ethylene glycol make-up stream; and add the ethylene glycol make-up stream to the first carbon dioxide recycle stream.

5. The set of process equipment of claim 2, wherein the condenser comprises a shell and tube heat exchanger to condense the ethylene glycol and carbon dioxide stream to produce the multiphase stream.

6. The set of process equipment of claim 2, wherein the multiphase separator comprises a two-phase separator configured to separate the multiphase stream into the water and ethylene glycol stream and the second carbon dioxide recycle stream.

7. The set of process equipment of claim 2, wherein the multiphase separator comprises a three-phase separator configured to separate the multiphase stream into the water and ethylene glycol stream, the second carbon dioxide recycle stream, and a hydrocarbon liquid stream.

8. The set of process equipment of claim 1, further comprising a water washing unit configured to:

receive the carbon dioxide reinjection stream from the natural gas liquids recovery column; and remove ethylene glycol from the carbon dioxide reinjection stream to produce an ethylene glycol and water stream and a sour natural gas liquids stream.

9. The set of process equipment of claim 8, further comprising a sweetening unit configured to:

receive the sour natural gas liquids stream from the water washing unit; and separate the sour natural gas liquids stream into an acid gas stream and a sweetened natural gas liquids stream.

10. A method for carbon dioxide recycle stream processing with ethylene glycol dehydrating in an enhanced oil recovery process, comprising:

receiving a first carbon dioxide recycle stream from a hydrocarbon formation, wherein the first carbon dioxide recycle stream comprises water, carbon dioxide, natural gas, and natural gas liquids;

adding ethylene glycol to the first carbon dioxide recycle stream to produce an ethylene glycol and carbon dioxide recycle stream;

condensing the ethylene glycol and carbon dioxide stream to produce a multiphase stream;

separating the multiphase stream into a water and ethylene glycol stream and a second carbon dioxide recycle stream, wherein the water and ethylene glycol stream comprises the water and the ethylene glycol, and wherein the second carbon dioxide recycle stream comprises the carbon dioxide, the natural gas, and the natural gas liquids;

separating the water and ethylene glycol stream into a water stream and an ethylene glycol stream; and separating the second carbon dioxide recycle stream steam into a carbon dioxide reinjection stream and a natural gas liquids stream.

11. The method of claim 10, further comprising aerosolizing the ethylene glycol stream to add the ethylene glycol stream to the first carbon dioxide recycle stream.

12. The method of claim 10, further comprising:

receiving an ethylene glycol make-up stream; and adding the ethylene glycol make-up stream to the first carbon dioxide recycle stream.

13. The method of claim 10, further comprising removing ethylene glycol from the carbon dioxide reinjection stream to produce an ethylene glycol and water stream and a sour natural gas liquids stream.

14. The method of claim 13, further comprising separating the sour natural gas liquids stream into an acid gas stream and a sweetened natural gas liquids stream.

15. An ethylene glycol dehydrator for use in an enhanced oil recovery process, comprising:

an ethylene glycol injector configured to:

receive a first carbon dioxide recycle stream from a hydrocarbon formation, wherein the first carbon dioxide recycle stream comprises water, carbon dioxide, natural gas, and natural gas liquids;

receive an ethylene glycol stream from an ethylene glycol regeneration system, wherein the ethylene glycol stream comprises ethylene glycol; and aerosolize the ethylene glycol stream to add the ethylene glycol stream to the first carbon dioxide recycle stream to produce an ethylene glycol and carbon dioxide recycle stream;

a condenser configured to:

receive the ethylene glycol and carbon dioxide recycle stream from the ethylene glycol injector; and condense the ethylene glycol and carbon dioxide recycle stream to produce a multiphase stream; and a multiphase separator configured to:

receive the multiphase stream from the condenser;

separate the multiphase stream to produce a water and ethylene glycol stream and a second carbon dioxide recycle stream;

transfer the water and ethylene glycol stream to the ethylene glycol regeneration system; and transfer the second carbon dioxide recycle stream to a natural gas liquids recovery column.

16. The ethylene glycol dehydrator of claim 15, wherein the ethylene glycol injector and the condenser are implemented as separate pieces of equipment.

17. The ethylene glycol dehydrator of claim 15, wherein the ethylene glycol injector and the condenser are implemented as a single piece of equipment.

18. The ethylene glycol dehydrator of claim 15, wherein the condenser comprises a shell and tube heat exchanger.

19. The ethylene glycol dehydrator of claim 15, wherein the multiphase separator comprises a two-phase separator.

20. The ethylene glycol dehydrator of claim 15, wherein the multiphase separator comprises a three-phase separator.

* * * * *